United States Patent
Kwon et al.

(10) Patent No.: US 9,997,836 B2
(45) Date of Patent: Jun. 12, 2018

(54) RERADIATION ANTENNA AND WIRELESS CHARGER

(71) Applicant: LG Electronics Inc., Seoul (KR)

(72) Inventors: Jaesoon Kwon, Seoul (KR); Jeongkyo Seo, Seoul (KR); Joosung Hwang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 250 days.

(21) Appl. No.: 14/621,772

(22) Filed: Feb. 13, 2015

(65) Prior Publication Data
US 2015/0288067 A1    Oct. 8, 2015

Related U.S. Application Data

(60) Provisional application No. 61/974,411, filed on Apr. 2, 2014.

(30) Foreign Application Priority Data

Apr. 24, 2014 (KR) .................. 10-2014-0049192
Jul. 2, 2014 (KR) .................. 10-2014-0082355

(51) Int. Cl.
*H01Q 9/04*    (2006.01)
*H02J 50/70*    (2016.01)
(Continued)

(52) U.S. Cl.
CPC ............. *H01Q 9/0407* (2013.01); *H01Q 1/22* (2013.01); *H01Q 1/48* (2013.01); *H01Q 1/52* (2013.01); *H01Q 5/364* (2015.01); *H01Q 9/40* (2013.01); *H01Q 21/30* (2013.01); *H02J 7/025* (2013.01); *H02J 50/12* (2016.02); *H02J 50/70* (2016.02); *H02J 50/90* (2016.02); *H01Q 1/3291* (2013.01); *H04B 5/0037* (2013.01); *H04B 5/0075* (2013.01)

(58) Field of Classification Search
None
See application file for complete search history.

(56) References Cited

U.S. PATENT DOCUMENTS 4,644,366 A * 2/1987 Scholz .................. H01Q 1/243
343/702
6,933,902 B2 * 8/2005 Yeh ...................... H01Q 1/243
343/700 MS
(Continued)

FOREIGN PATENT DOCUMENTS

CN     1516315 A    7/2004
CN    101651256 A    2/2010
(Continued)

*Primary Examiner* — Trinh Dinh
(74) *Attorney, Agent, or Firm* — Birch, Stewart, Kolasch & Birch, LLP

(57) ABSTRACT

A reradiation antenna including an insulation panel; a ground contact formed on one side of the insulation panel; a slot formed by eliminating a part of the ground contact by exposing the insulation panel; a power feeding unit formed on the insulation panel between the slot and separated from the ground contact and connected with a power source using a first end of the power feeding unit; and a radiation unit formed on one side of the insulation panel, and connected with a second end of the power feeding unit positioned at an opened end of the slot.

13 Claims, 23 Drawing Sheets

(51) Int. Cl.
  *H02J 50/90* (2016.01)
  *H02J 50/12* (2016.01)
  *H01Q 1/22* (2006.01)
  *H01Q 1/48* (2006.01)
  *H02J 7/02* (2016.01)
  *H01Q 1/52* (2006.01)
  *H01Q 9/40* (2006.01)
  *H01Q 21/30* (2006.01)
  *H01Q 5/364* (2015.01)
  *H01Q 1/32* (2006.01)
  *H04B 5/00* (2006.01)

(56) References Cited

U.S. PATENT DOCUMENTS

| | | | | |
|---|---|---|---|---|
| 7,265,718 | B2* | 9/2007 | Tsai | H01Q 1/24 |
| | | | | 343/700 MS |
| 7,385,556 | B2* | 6/2008 | Chung | H01Q 1/38 |
| | | | | 343/700 MS |
| 7,450,077 | B2* | 11/2008 | Waterhouse | H01Q 1/273 |
| | | | | 343/700 MS |
| 7,583,231 | B2* | 9/2009 | Kwon | H01Q 1/38 |
| | | | | 343/700 MS |
| 7,956,816 | B2* | 6/2011 | Minard | H01Q 1/38 |
| | | | | 343/730 |
| 2004/0100406 | A1 | 5/2004 | Okado | |
| 2004/0108955 | A1 | 6/2004 | Sjoblom | |
| 2005/0057405 | A1 | 3/2005 | Horibe | |
| 2006/0050002 | A1* | 3/2006 | Wang | H01Q 13/106 |
| | | | | 343/767 |
| 2007/0080867 | A1* | 4/2007 | Son | H01Q 1/2208 |
| | | | | 343/700 MS |
| 2009/0040105 | A1* | 2/2009 | Makinen | H01P 1/184 |
| | | | | 342/372 |
| 2010/0039344 | A1 | 2/2010 | Chang | |
| 2010/0231463 | A1* | 9/2010 | Liu | H01Q 1/243 |
| | | | | 343/702 |
| 2013/0059528 | A1 | 3/2013 | Hirai | |
| 2013/0106346 | A1 | 5/2013 | Salter et al. | |
| 2013/0181535 | A1 | 7/2013 | Muratov et al. | |
| 2013/0252661 | A1 | 9/2013 | Holz et al. | |
| 2014/0320362 | A1* | 10/2014 | Peng | H01Q 3/26 |
| | | | | 343/767 |

FOREIGN PATENT DOCUMENTS

| | | |
|---|---|---|
| CN | 103125082 A | 5/2013 |
| CN | 103259094 A | 8/2013 |
| EP | 1564842 A1 | 8/2005 |
| JP | 2005-73168 A | 3/2005 |
| JP | 2011-249881 A | 12/2011 |
| JP | 2014-39238 A | 2/2014 |
| KR | 10-2009-0032157 A | 4/2009 |
| KR | 10-1075583 B1 | 10/2011 |
| KR | 10-2013-0134759 A | 12/2013 |
| WO | WO 2013/180399 A1 | 12/2013 |

\* cited by examiner

@900MHz
(a)

@1800MHz
(b)

@2100MHz
(c)

@2700MHz
(d)

(a)

(b)

RERADIATION ANTENNA AND WIRELESS CHARGER

Pursuant to 35 U.S.C. § 119(e), this application claims the benefit of priority to U.S. Provisional Patent Application No. 61/974,411, filed on Apr. 2, 2014, which is hereby incorporated by reference as if fully set forth herein. Pursuant to 35 U.S.C. § 119(a), this application claims the benefit of earlier filing date and right of priority to Korean Application No. 10-2014-0049192, filed on Apr. 24, 2014 and No. 10-2014-0082355, filed on Jul. 2, 2014, which are hereby incorporated by reference as if fully set forth herein.

BACKGROUND OF THE INVENTION

Field of the Invention

The present invention relates to a reradiation antenna capable of receiving a radio signal and reradiating the radio signal and a wireless charger equipped with a wireless charging performance, which is not deteriorated by the reradiation antenna.

Discussion of the Related Art

Recently, due to a high-rise building and a complex inside space, a radio shadow area where propagation environment is poor in a wireless communication system is generated inside of a building. In addition, when staying inside of a vehicle, since the vehicle is made with metal frames, the transmission and reception rate of a radio wave is degraded.

As one of technologies used for solving the aforementioned problems, a relay is used to improve the poor propagation environment. The technology using the relay is designed to improve the propagation environment using an active relay configured to use two antennas and a bidirectional amplification circuit between the two antennas or a passive relay configured to connect two antennas with each other using a coaxial cable or a waveguide.

In particular, the propagation environment of a radio shade area can be improved by installing an antenna in the outside of a building or a vehicle and connecting the antenna to a reradiation antenna installed in the inside of the building or the vehicle with each other using a waveguide or a coaxial cable. However, since the technology using a relay radiates an electromagnetic wave, the technology may affect surrounding electronic devices. In particular, for a vehicle on which electronic devices are internally concentrated, it may affect a different electronic device as well. Moreover, it is difficult to apply the technology using a relay to various communication standards including a frequency of a different band.

SUMMARY OF THE INVENTION

Accordingly, one aspect of the present invention is directed to an apparatus and method thereof that substantially obviate one or more problems due to limitations and disadvantages of the related art.

When a reradiation antenna arranged in the vicinity of a wireless charger, an object of the present invention is to provide a reradiation antenna capable of improving a communication environment while not degrading performance of the wireless charger and the wireless charger equipped with the reradiation antenna.

To achieve these and other advantages and in accordance with the purpose of the present invention, as embodied and broadly described herein, the present invention provides in one aspect a reradiation antenna including an insulation panel; a ground contact formed on one side of the insulation panel; a slot formed by eliminating a part of the ground contact by exposing the insulation panel; a power feeding unit formed on the insulation panel between the slot and separated from the ground contact and connected with a power source using a first end of the power feeding unit; and a radiation unit formed on one side of the insulation panel, and connected with a second end of the power feeding unit positioned at an opened end of the slot.

In another aspect, the present invention provides a wireless charger including a housing; a power transmission coil included in an inside of the housing and configured to wirelessly transmit electric power to an external terminal; and a reradiation antenna formed above the power transmission coil and configured to reradiate an antenna signal. Further, the reradiation antenna includes an insulation panel; a ground contact formed on one side of the insulation panel; a slot formed by eliminating a part of the ground contact by exposing the insulation panel; a power feeding unit formed on the insulation panel between the slot and separated from the ground contact and connected with a power source using a first end of the power feeding unit; and a radiation unit formed on one side of the insulation panel, and connected with a second end of the power feeding unit positioned at an opened end of the slot.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and the embodiments presented herein are not limited by the accompanying drawings. As such, the present invention should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present. In contrast, when an element is referred to as being "directly connected with" another element, there are no intervening elements present. A singular representation may include a plural representation unless it represents a definitely different meaning from the context. Terms such as "include" or "has" are used herein and should be understood that they are intended to indicate an existence of a characteristic, a number, an operation, a component, a part and combination thereof disclosed in the specification, and it should not be construed as existence or possibility of adding one or more different characteristics, numbers, steps, operations components parts or combination thereof is excluded in advance.

Figure 1:
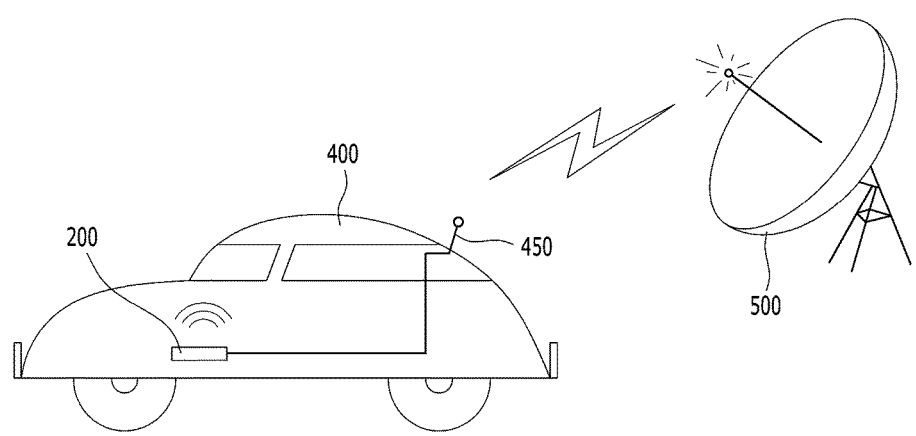
FIG. 1 is a diagram illustrating a concept of a reradiation antenna according to an embodiment of the present invention.

FIG. 1 is a diagram illustrating a concept of a reradiation antenna 200 according to an embodiment of the present invention. A radio wave transmission and reception rate of a terminal situating at the inside of a building or the inside of a vehicle 400 may be considerably degraded because a radio wave transmitted from a base station 500 collides with the building or is shielded by a metal forming an exterior of the vehicle 400. A place to which a part of radio waves is not delivered is called a radio shadow area. In order to increase a radio wave transmission and reception rate of the radio shadow area, a reradiation antenna 200 can be installed.

Figure 2:
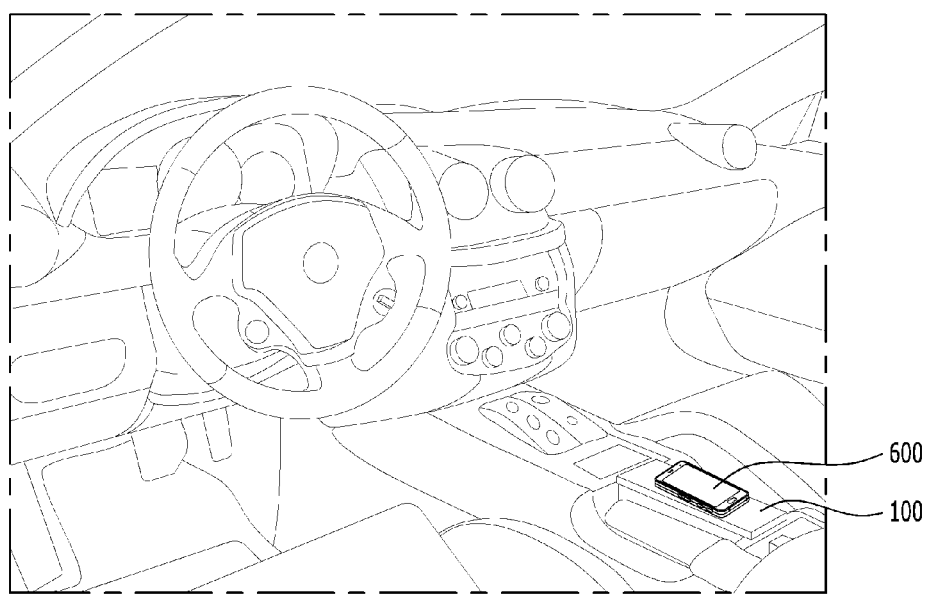
FIG. 2 is a diagram illustrating a wireless charger mounted on a vehicle according to an embodiment of the present invention.

Referring to FIG. 2, if an external antenna 450 is installed in the outside of the vehicle 400 and a signal received by the external antenna 450 is transmitted to a terminal 600 positioned at the inside of the vehicle 400 via a reradiation antenna 200 situating at the inside of the vehicle 400, a radio wave transmission and reception rate of the terminal 600 can be increased.

Yet, since the reradiation antenna 200 transmits and receives a signal using an electromagnetic wave, the reradiation antenna considerably affects surrounding devices and is severely affected by the surrounding devices. Hence, the reradiation antenna 200 should be located at a position where the reradiation antenna 200 has a less impact to a different device in consideration of a relation with the different device. In addition, if a distance between the reradiation antenna and the terminal 600 is far, the performance of the reradiation antenna 200 is also degraded. Hence, a study on the reradiation antenna 200 minimizing impact between the reradiation antenna 200 and surrounding devices and reducing the distance from the terminal 600 is in progress.

FIG. 2 is a diagram illustrating a wireless charger mounted on a vehicle according to an embodiment of the present invention. By using the wireless charging scheme, the terminal can be charged by placing the terminal 600 on the wireless charger 100 only instead of connecting the terminal 600 and the wireless charger 100 with each other using a cable. Moreover, it reduces the inconvenience of separating a charging cable from the terminal whenever it is used.

In particular, when mounting the terminal 600 on a charger again after the terminal 600 is used, a user should repeatedly connect/disconnect a charging cable to/from the terminal. This not only interferes the user's driving but also makes it difficult to use the terminal while the charging cable is connected. Hence, the terminal 600 can be easily charged by installing the wireless charger 100 in the vehicle 400.

If the wireless charger 100 is installed in the vehicle 400, the terminal 600 is mostly used when the terminal 600 is mounted on the wireless charger 100. In addition, when making a call, a user can make a call by hands-free using a Bluetooth function while the terminal is mounted on the wireless charger. Thus, a reception rate of an antenna signal is very important when the terminal 600 is mounted on the wireless charger 100. Hence, in order to maximally increase the efficiency of the reradiation antenna 200 installed in the inside of the vehicle 400, it is preferable to place the reradiation antenna 200 closer to the terminal 600. Hence, it is preferable to install the reradiation antenna 200 in the wireless charger 100.

However, as mentioned in the foregoing description, since the reradiation antenna 200 and a power transmission coil of the wireless charger 100 effect each other, one embodiment of the present invention provides the reradiation antenna 200 capable of minimizing impact between the power transmission coil and the reradiation antenna 200 and the wireless charger 100 equipped with the reradiation antenna 200.

Figure 3:
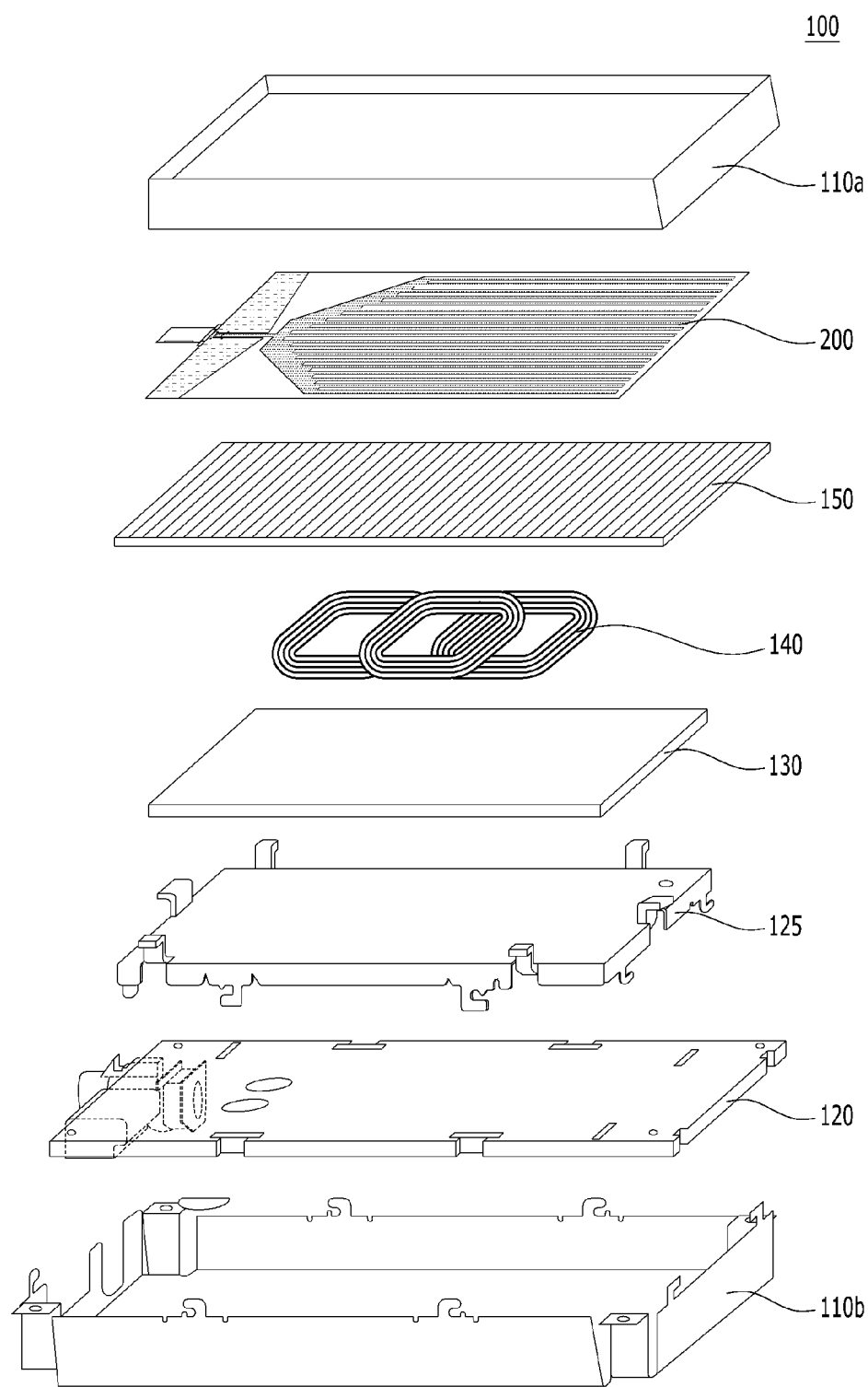
FIG. 3 is a disassembled perspective diagram illustrating one embodiment of a wireless charger according to one side of the present invention.

Next, FIG. 3 is a disassembled perspective diagram illustrating one embodiment of a wireless charger 100 according to one embodiment of the present invention. A wireless charger 100 includes a housing 110a/110b containing electronic apparatus in the housing, a printed circuit board 120, a shield can 125, a ferrite sheet 130, a power transmission coil 140, an electromagnetic field shielding sheet 150 and a reradiation antenna 200 as a control unit mounted on the inside of the housing.

The housing 110a/110b can be classified into an upper housing 110a and a bottom housing. The power transmission coil 140 and the reradiation antenna 200 are included in the housing and a terminal configured to supply power to the power transmission coil 140 and a terminal configured to supply an antenna signal, which is received via an external antenna 450 positioned at the external of the vehicle 400, to the reradiation antenna 200 can be exposed from the housing.

In order for the terminal 600 to be safely mounted on the top of the housing 110a/110b, a protrusion can be formed around the top of the housing 110a/110b. Or, a material (e.g., non-woven fabric, silicon, rubber and the like) of which frictional force is large can be added to the top of the housing to prevent the terminal 600 from moving on the top of the housing 110a/110b.

The controller receives external power using the printed circuit board 120, provides the external power to the power transmission coil 140 and transmits a signal delivered from the external antenna 450 to the reradiation antenna 200. The shield can 125 can be further equipped on the top of the printed circuit board 120 to radiate heat and provide a space capable of being used for mounting a part on the shield can.

If electric current flows in the power transmission coil 140, which is positioned at the top of the printed circuit board 120, an electromagnetic field is formed and electric current flows in a power transmission coil of the external terminal 600 due to the electromagnetic field. By doing so, the external terminal 600 can be charged. According to the present embodiment, the power transmission coil 140 is positioned at the top of the shield can 125.

A wireless charging scheme includes a magnetic resonance scheme and an electromagnetic induction scheme. The electromagnetic induction scheme corresponds to a scheme charging an electronic device using an induced current principle. Electric current flowing in a power transmission coil 140 mounted on a portable charging device forms an electromagnetic field and electric current may flow in a power reception coil positioned within the electromagnetic field due to the electromagnetic field. The magnetic resonance scheme corresponds to a scheme charging an electronic device using a resonance scheme, which is a phenomenon of pulsating with broad amplitude in a specific frequency. The magnetic resonance scheme uses a strong magnetic field combining phenomenon, which is formed between a power transmission coil 140 and a power reception coil including an identical resonant frequency.

Although the efficiency of the electromagnetic induction scheme is high, both a power transmission coil 140 and a power reception coil are preferably positioned at an adjacent location. If the power transmission coil is separated from the power reception coil or the power transmission coil and the power reception coil are diagonally arranged, the efficiency of the electromagnetic induction scheme is considerably decreased. Hence, when charging an electronic device using the electromagnetic induction scheme, arrangement between the power transmission coil and the power reception coil is very important.

On the contrary, the efficiency of the magnetic resonance scheme is not high enough compared to the electromagnetic induction scheme. However, since an electronic device can be charged in a separated distance using the magnetic resonance scheme, there is no restriction on using the magnetic resonance scheme. Moreover, there is a merit in that unused energy is reabsorbed into a magnetic field when using the magnetic resonance scheme.

The ferrite sheet 130 can be further included on the top or the bottom of the power transmission coil 140. The ferrite sheet 130 improves a circuit flow of a flux line of a coil and reduces an amount of electromagnetic radiation radiated from the power transmission coil 140.

In addition, a device using an electromagnetic field is regulated by EMI (Electro Magnetic Interference). The EMI restricts an electronic device to radiate an electromagnetic wave stronger than a prescribed strength to prevent the electronic device from affecting an external device. In order to satisfy the regulation, an electromagnetic field shielding sheet 150 is used. The electromagnetic field shielding sheet 150 includes a conductive material. The conductive material can be arranged by forming a pattern (hereinafter called electromagnetic field shielding sheet 150 pattern) in one direction to minimize impact on an electromagnetic field, which directly affects charging of an electronic device, among an electromagnetic field formed by the power transmission coil 140 and shield unnecessary electromagnetic field causing noise.

Since the electromagnetic field shielding sheet 150 can reduce the strength of a surrounding electromagnetic field, the electromagnetic field shielding sheet 150 can reduce the strength of an electromagnetic field radiated by the power transmission coil 140 to satisfy the regulation of the EMI. However, the electromagnetic field shielding sheet can also reduce the performance of the reradiation antenna 200 at the same time.

As shown in FIG. 3, if the reradiation antenna 200 is positioned at the top of the power transmission coil 140, it is difficult to transmit power via the power transmission coil 140 by penetrating the reradiation antenna 200. Hence, the efficiency of delivering power to the terminal 600, which is mounted on the top of the housing 110a/110b, may be degraded. On the contrary, if the reradiation antenna 200 is positioned at the bottom of the power transmission coil 140, a signal radiated by the reradiation antenna 200 and a noise are mixed with each other due to the power transmission coil 140, thereby deteriorating communication quality.

In order to solve the aforementioned problems, one embodiment of the present invention provides the reradiation antenna 200, which is positioned at the top of the power transmission coil 140, capable of minimizing the impact of the electromagnetic field shielding sheet 150 while power delivery transmitted by the power transmission coil 140 to the terminal 600 is not interrupted. In the following, the reradiation antenna 200 according to an embodiment of the present invention is described with reference to FIG. 4 to FIG. 7.

Figure 4:
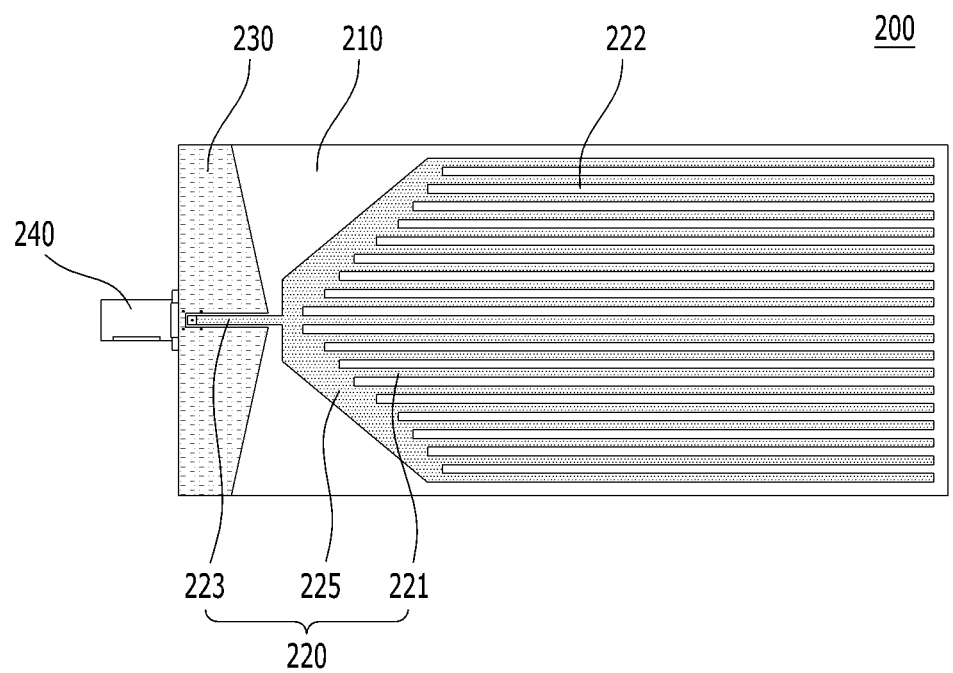
FIG. 4 is a diagram illustrating one embodiment of a reradiation antenna according to a different side of the present invention.
Figure 5:
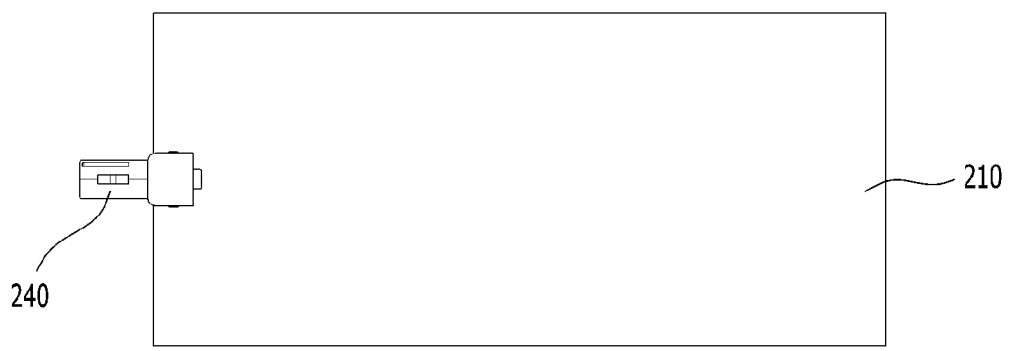
FIG. 5 is a diagram illustrating a bottom side of a reradiation antenna according to one embodiment of the present invention.
Figure 6:
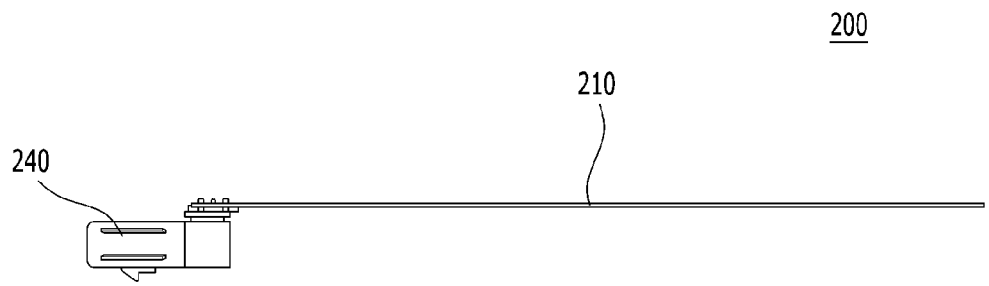
FIG. 6 is a diagram illustrating a side of a reradiation antenna according to one embodiment of the present invention.
Figure 7:
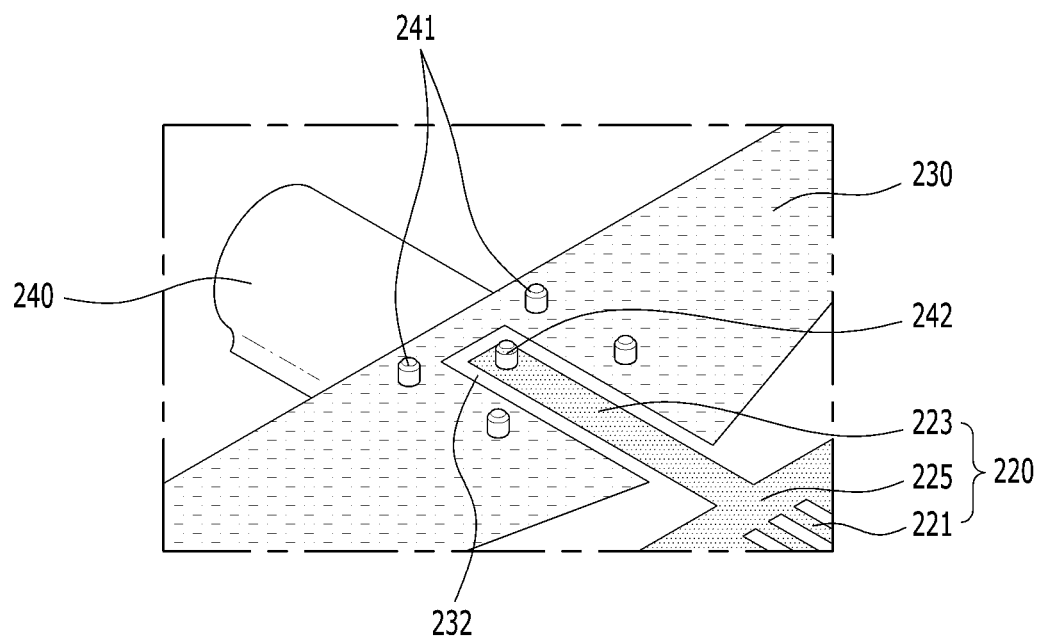
FIG. 7 is a diagram illustrating a connector part of a reradiation antenna according to one embodiment of the present invention.

FIG. 4 is a diagram illustrating a reradiation antenna 200, FIG. 5 is a diagram illustrating a bottom side of the reradiation antenna 200, FIG. 6 is a diagram illustrating a side of the reradiation antenna 200 and FIG. 7 is a diagram illustrating a connector part of the reradiation antenna 200 according to an embodiment of the present invention.

The reradiation antenna 200 includes an insulation panel 210, a radiation unit 220, an insulation unit and a connector 240. The insulation panel 210 corresponds to a board-shape member including a nonconductive material. The insulation panel can be made up of epoxy, fiberglass or the like such as FR-4. The radiation unit 220 and the insulation unit are formed on the insulation panel 210.

Electric current corresponding to an antenna signal is supplied to the radiation unit 220 from a power source and the radiation unit radiates the received antenna signal. The radiation unit 220 includes a conductor having a conductive material. The radiation unit includes a shape corresponding to a monopole antenna receiving a signal input in one side of the radiation unit. Referring to FIG. 4, a signal is input to one end of the left side of the radiation unit and the signal is delivered to the right direction of the radiation unit to be radiated.

When the radiation unit 220 is formed by a single plane member, an electromagnetic field formed by the power transmission coil 140, which is positioned at the bottom of the radiation unit, generates a vortex due the radiation unit 220 of the reradiation antenna 200. In this instance, the efficiency of charging is decreased and heat is produced in a product. In order to solve the aforementioned problem, a plurality of slits 222 extend in a first direction on the radiation unit 220 and the electromagnetic field of the power transmission coil 140 can pass through between the slits 222. By using the slits 222, the performance of the wireless charger is maintained, charging of the terminal 600 is enabled and heat produced by the vortex can be prevented.

In order to prevent the performance of the reradiation antenna 200 from being degraded by an impact of the electromagnetic field shielding sheet 150, it is preferable to form a direction of the slit 222 to be orthogonal to a direction of an electromagnetic field shielding sheet 150 pattern to isolate the slits from the electromagnetic field shielding sheet 150.

Figure 8:
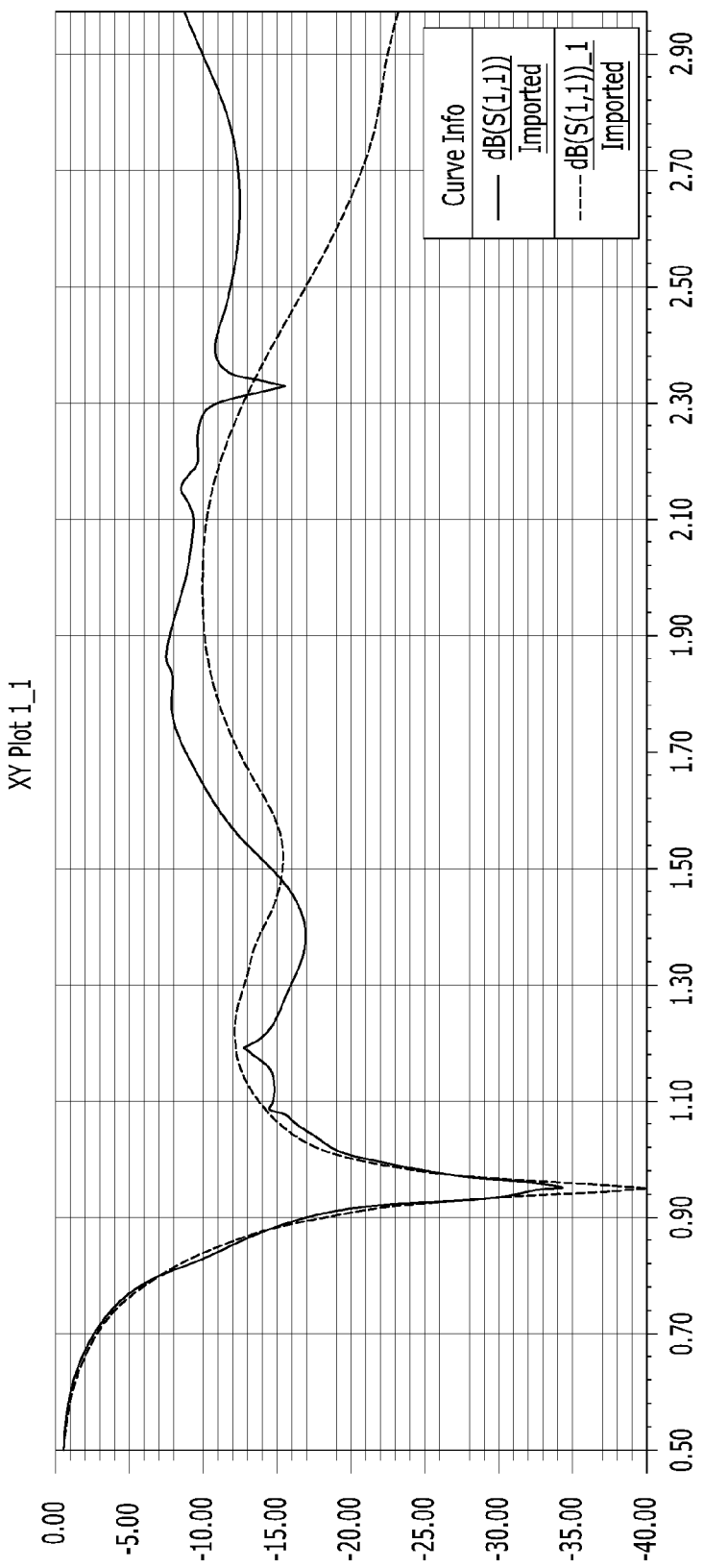
FIG. 8 is a graph showing efficiency according to a slit direction of a reradiation antenna and a direction of an electromagnetic field shielding sheet pattern of the present invention.

FIG. 8 is a graph showing the efficiency according to a direction of a slit 222 of a reradiation antenna 200 and a direction of an electromagnetic field shielding sheet 150 pattern of the present invention. A horizontal axis indicates a wavelength and a vertical axis indicates a reflection coefficient. As a reflection coefficient value is smaller, a radiation/reception performance for a radio wave is better. The solid line indicates the efficiency of the reradiation antenna 200 when the direction of the slit 222 of the reradiation antenna 200 and the direction of the electromagnetic field shielding sheet 150 pattern are arranged in parallel. The dotted line indicates the efficiency of the reradiation antenna 200 when the direction of the slit 222 of the reradiation antenna 200 is arranged orthogonal to the direction of the electromagnetic field shielding sheet 150 pattern.

As a reflection coefficient value is smaller, a radiation/reception performance is better. As shown in the graph, there is no large difference in the low frequency, and a performance difference appears in high frequencies higher than 2.5 GHz. In particular, when the direction of the slit 222 of the reradiation antenna 200 is orthogonal to the direction of the electromagnetic field shielding sheet 150 pattern, the performance is better.

Due to the slits 222 formed in a first direction, the radiation unit 220 can be configured by a monopole antenna including a plurality of conductive tapes 221 extended in the first direction are arranged in a second direction in parallel. A length of the radiation unit 220 is relevant to a wavelength of a transceived signal. Since the length of the radiation unit should be longer than ¼ wavelength of a transceived signal, as shown in FIG. 4, if a length of the conductive tape 221 is variously configured, signals of various frequency bands can be transceived.

Figure 9:
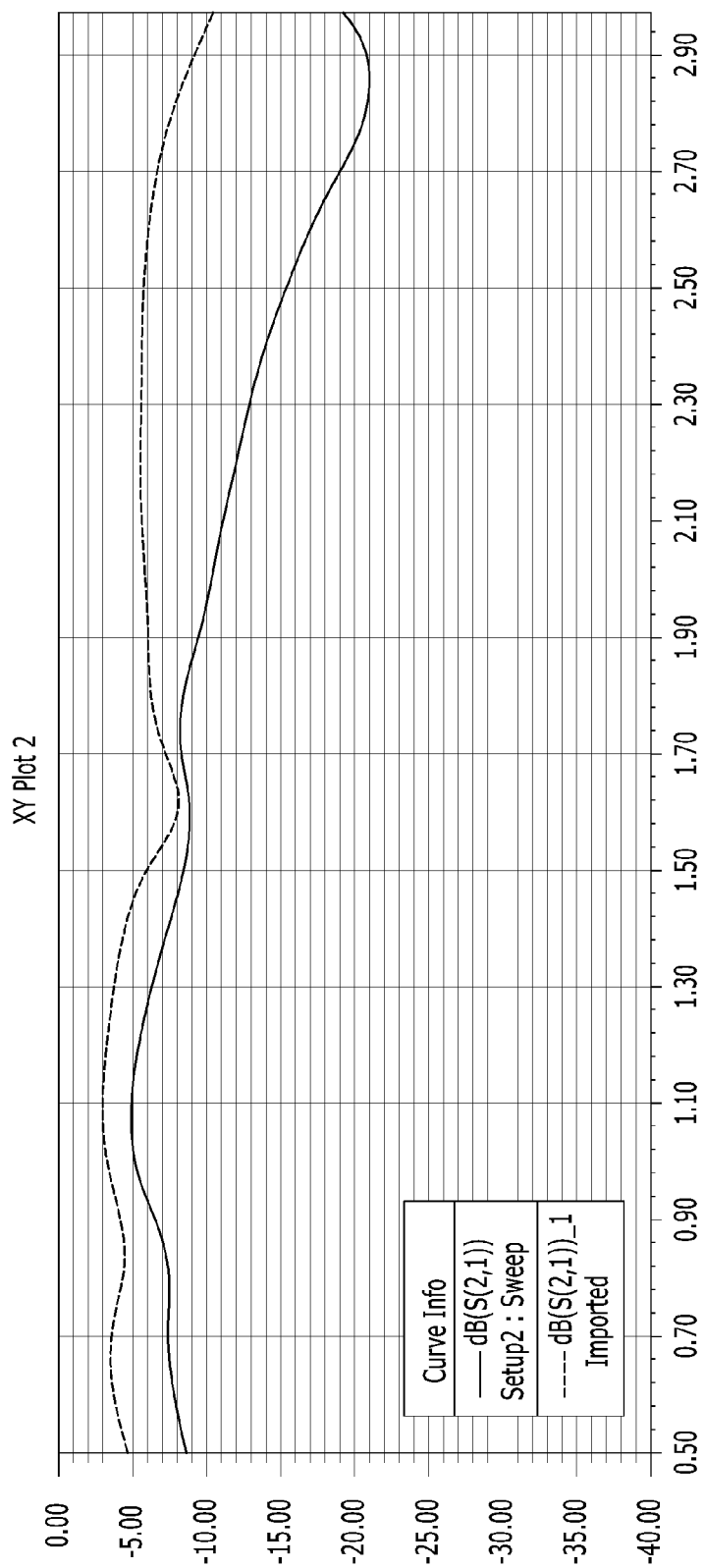
FIG. 9 is a graph showing efficiency according to whether there exist resonance between a reradiation antenna and an antenna of a terminal of the present invention.

FIG. 9 is a graph showing the efficiency according to whether there exist resonance between a reradiation antenna 200 and an antenna of the terminal 600 of an embodiment of the present invention. A horizontal axis indicates frequency and a vertical axis indicates a loss rate of a signal. The dotted line indicates when a resonant frequency of the reradiation antenna 200 is identical to a resonant frequency of the antenna of the terminal 600. On the contrary, the solid line indicates when the resonant frequency of the reradiation antenna 200 is different from the resonant frequency of the antenna of the terminal 600. In the former case, since an amount of lost energy is smaller than that of the latter case, the former case is more efficient than the latter case. In particular, if a conductive tape 221 of various lengths is equipped to make a mutual coupling with antennas of various terminals 600 by matching a resonant frequency with each other, the signal transmission efficiency of an antenna can be enhanced.

A length of the conductive tape 221 can be variously arranged. However, as shown in FIG. 4, in order for a power feeding unit 223 to deliver electric current to each conductive tape 221, a short conductive tape 221 is arranged at both ends and a long conductive tape 221 is arranged at the center. In order for the power feeding unit 223 to deliver electric current to each conductive tape 221, a distribution unit of a V shape can be included. A bigger distribution unit 225 is formed as the distribution unit is closer to the power feeding unit 223 and a smaller distribution unit is formed as the distribution unit is closer to the both ends. By doing so, the electric current can be evenly delivered to each conductive tape 221.

A ground contact unit 230 is grounded by being connected to the ground. The radiation unit 220 of the reradiation antenna 200 is grounded to block noise of the antenna and reduce a length of the radiation unit 220 to ¼ of a wavelength using a mirror effect. In order to reduce the length of the radiation unit 220 and noise, the ground contact unit 230 can be installed in a part of the insulation panel 210.

The ground contact unit 230 includes a conductive material and is formed by being separated from the radiation unit in order not to be contacted with the radiation unit 220. Although a legacy ground contact unit 230 used to be formed at a bottom side of the insulation panel 210 as shown in FIG. 5, the reradiation antenna 200 according to an embodiment of the present invention does not form the ground contact unit 230 on the bottom side of the insulation panel 210. Instead, the ground contact unit 230 and the radiation unit 220 can be formed together on one side of the insulation panel. By doing so, a process of manufacturing the bottom side of the insulation panel 210 to form the ground contact unit 230 can be omitted.

Since the ground contact unit 230 should be grounded by being connected to the ground and the radiation unit 220 should receive a signal, a connector 240 can be installed in one side of the reradiation antenna to connect the ground contact unit 230 to the ground and transmit a signal to the radiation unit 220 (refer to FIG. 6 and FIG. 7).

A plurality of pins are formed on the connector 240. A first pin 241 is connected to the ground by being connected with the ground contact unit 230 and a second pin 242 is connected to a power source by being connected with the power feeding unit 223 of the radiation unit 220. As shown in FIG. 7, in order to connect with the connector 240 positioned at an end, a slot 232 is formed on the ground contact unit 230, the power feeding unit 223 is extended between the slot 232 formed on the ground contact unit 230 by not being contacted with the ground contact unit 230 and an end of the power feeding unit 223 can be connected with the pin 242 of the connector 240.

Figure 10:
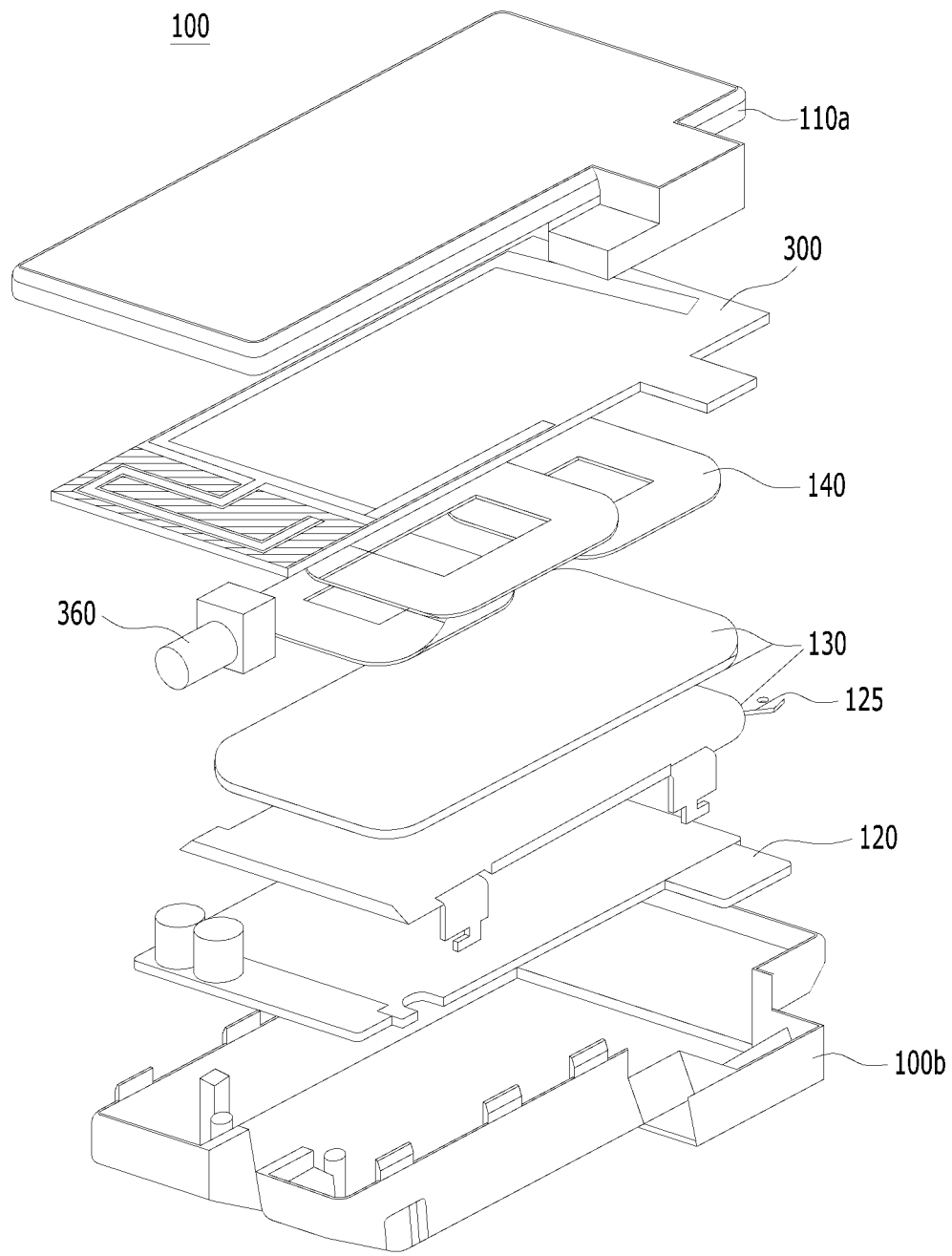
FIG. 10 is a disassembled perspective diagram illustrating a different embodiment of a wireless charger according to one side of the present invention.

FIG. 10 is a disassembled perspective diagram illustrating a different embodiment of a wireless charger according to one side of the present invention. A wireless charger 100 includes a housing 110a/110b containing an electronic apparatus in the housing, a printed circuit board 120, a shield can 125, a ferrite sheet 130, a power transmission coil 140 and a reradiation antenna 300 as a control unit mounted on the inside of the housing.

The housing 110a/110b can be classified into an upper housing 110a and a bottom housing. The power transmission coil 140 and the reradiation antenna 200 are included in the housing and a terminal configured to supply power to the power transmission coil 140 and a terminal configured to supply an antenna signal, which is received via an external antenna 450 positioned at the external of the vehicle 400, to the reradiation antenna 200 can be exposed from the housing.

In order for the terminal 600 to be safely mounted on the top of the housing 110a/110b, a protrusion can be formed around the top of the housing 110a/110b. Or, a material (e.g., non-woven fabric, silicon, rubber and the like) of which frictional force is big can be added to the top of the housing to prevent the terminal 600 from being dropped from the top of the housing 110a/110b.

The controller receives external power using the printed circuit board 120, provides the external power to the power transmission coil 140 and transmits a signal delivered from the external antenna 450 to the reradiation antenna 200. The shield can 125 can be further equipped on the top of the printed circuit board 120 to radiate heat and provide a space capable of being used for mounting a part on the shield can.

When electric current flows in the power transmission coil 140, which is positioned at the top of the printed circuit board 120, an electromagnetic field is formed and electric current flows in a power transmission coil of the external terminal 600 due to the electromagnetic field. By doing so, the external terminal 600 can be charged. According to the present embodiment, the power transmission coil 140 is positioned at the top of the shield can 125.

In addition, a wireless charging scheme includes a magnetic resonance scheme and an electromagnetic induction scheme. The electromagnetic induction scheme corresponds to charging an electronic device using an induced current principle. Electric current flowing in the power transmission coil 140 mounted on a portable charging device forms an electromagnetic field and electric current may flow in a power reception coil positioned within the electromagnetic field due to the electromagnetic field.

The magnetic resonance scheme corresponds to charging an electronic device using resonance, which is a phenomenon of pulsating with broad amplitude in a specific frequency. The magnetic resonance scheme uses a strong magnetic field combining phenomenon, which is formed between a power transmission coil 140 and a power reception coil 130 including an identical resonant frequency.

Although the efficiency of the electromagnetic induction scheme is high, both the power transmission coil 140 and a power reception coil should be positioned at an adjacent location. If the power transmission coil is separated from the power reception coil or the power transmission coil and the power reception coil are diagonally arranged, the efficiency of the electromagnetic induction scheme is considerably decreased. Hence, when charging an electronic device using the electromagnetic induction scheme, arrangement between the power transmission coil and the power reception coil is very important.

On the contrary, the efficiency of the magnetic resonance scheme is not as high enough compared to the electromagnetic induction scheme. However, since an electronic device can be charged in a separated distance using the magnetic resonance scheme, there is no restriction on using the magnetic resonance scheme. Moreover, unused energy is reabsorbed into a magnetic field when using the magnetic resonance scheme.

The ferrite sheet 130 can be further included on the top or the bottom of the power transmission coil 140. The ferrite sheet 130 improves a circuit flow of a flux line of a coil and reduces amount of electromagnetic radiation radiated from the power transmission coil 140. As shown in FIG. 10, when the reradiation antenna 300 is positioned at the top of the power transmission coil 140, since the reradiation antenna 300 includes a conductive material, if power delivered from the power transmission coil 140 is not passing through the reradiation antenna 300, the performance of the wireless charger 100 is degraded.

It is difficult to transmit power via the power transmission coil 140 by passing through the reradiation antenna 300. Hence, the efficiency of delivering power to the terminal 600, which is mounted on the top of the housing 110a/110b, may be degraded. On the contrary, if the reradiation antenna 300 is positioned at the bottom of the power transmission coil 140, a signal radiated by the reradiation antenna 300 and a noise are mixed with each other due to the power transmission coil 140, thereby deteriorating communication quality.

In order to solve the aforementioned problem, one embodiment of the present invention provides the reradiation antenna 300 capable of not interrupting a delivery of power transmitted by the power transmission coil 140 to the terminal 600 although the reradiation antenna 300 is put on the top of the power transmission coil 140. In the following, the reradiation antenna 300 according to an embodiment of the present invention is explained.

Figure 11:
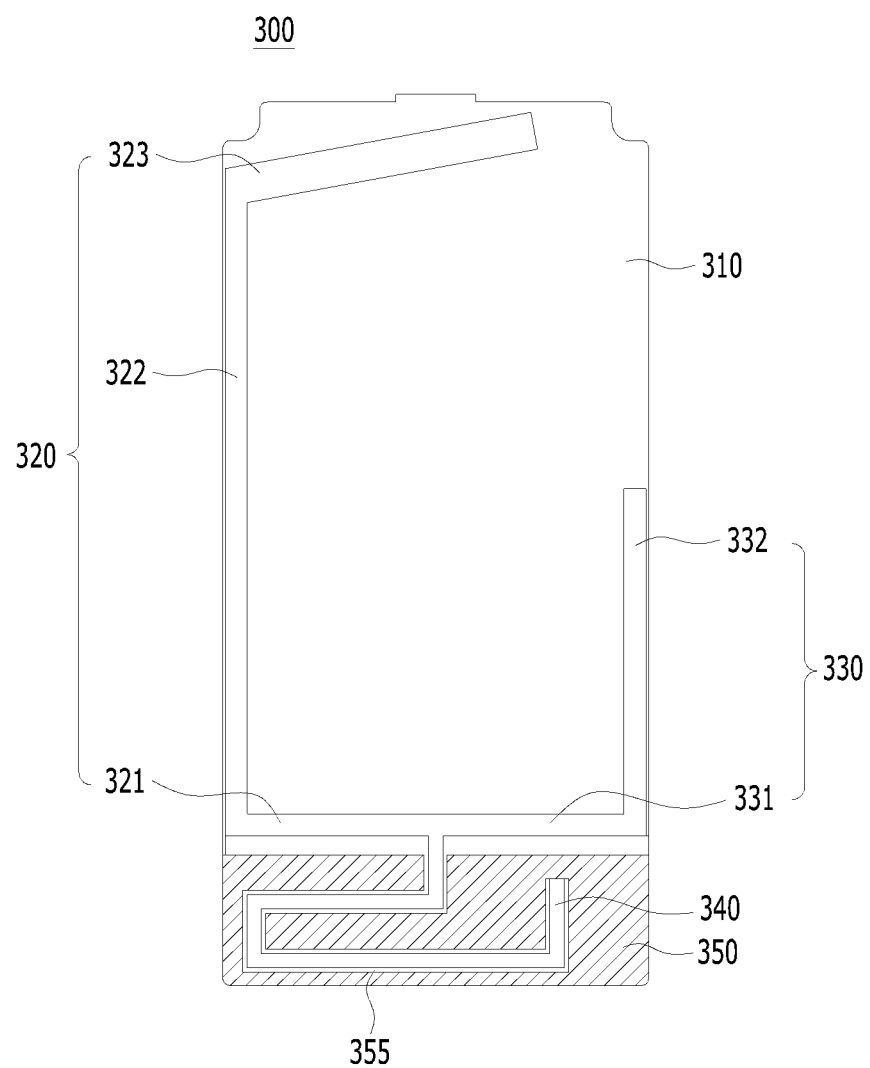
FIG. 11 is a diagram illustrating a different embodiment of a reradiation antenna according to a different side of the present invention.

In particular, FIG. 11 is a diagram illustrating a different embodiment of the reradiation antenna 300 according to a different side. As shown, the reradiation antenna 300 includes an insulation panel 310, a ground contact unit 350, a power feeding unit 340 formed in slot 355, which are formed on the ground contact unit 350, and a radiation unit 320/330.

The insulation panel 310 corresponds to a board-shape member including a nonconductive material. The insulation panel can be made up of epoxy, fiberglass or the like such as FR-4. The radiation unit 320/330, the ground contact unit 350 and the power feeding unit 340 are formed on the insulation panel 310.

The ground contact unit 350 is formed by applying a conductive material to one side of the insulation panel 310. The ground contact unit is grounded by being connected to the ground and plays a role of blocking noise of the reradiation antenna. Although a length of the radiation unit 320/330 is reduced to ¼ of a wavelength using a mirror effect, the antenna can transceive a signal of a preferred frequency. In particular, the ground contact unit 350 is installed in one side of the insulation panel 310 to reduce the length of the radiation unit 320/330 and the noise of the reradiation antenna.

As shown in FIG. 11, the ground contact unit 350 can be positioned at one end of the insulation panel 310. When combining the ground contact unit 350 with a connector 360, which is used to connect with the ground, it is preferable to form the ground contact unit 350 to be one-sided rather than to be positioned at the center. In order to sufficiently secure a length of the radiation unit 320/330, the ground contact unit 350 can be configured to be one-sided.

In addition, in order to deliver power transmitted by the power transmission coil 140 to a mobile terminal 600 positioned at the top of the housing 110 according to an embodiment of the present invention, there should be no obstacle between the power transmission coil 140 and the mobile terminal 600. In particular, as shown in FIG. 11, in order not to assign a conductive material to a center part of the insulation panel 310 and empty the center part of the insulation panel, the ground contact unit 350 can be positioned at one side of the insulation panel 310.

The power feeding unit 340 is connected with a power source and permits electric current to the radiation unit 320/330. In particular, one end of the power feeding unit 340 is connected with the power source and another end of the power feeding unit is connected with the radiation unit 320/330. By doing so, when electric current is permitted to the radiation unit 320/330, a signal can be transceived.

The power feeding unit 340 is extended along the slot 355, which are formed on the ground contact unit 350. The slot 355 is formed by eliminating a part of the ground contact unit 350. One end of the slot 355 is opened and another end of the slot is closed. Since the power feeding unit 340, which is extended along the slot 355, also performs a function of the radiation unit configured to radiate a signal, the power feeding unit is away from the ground contact unit 350 as much as a prescribed space. A transmission and reception rate of the reradiation antenna 300 may vary according to a shape of the power feeding unit 340.

The power feeding unit 340 supplies electric current corresponding to an antenna signal to the radiation unit 320/330 and the radiation unit radiates the received antenna signal. The radiation unit 320/330 includes a conductor including a conductive material. The radiation unit corresponds to a monopole antenna including a shape of receiving a signal input in one side of the radiation unit.

As shown in FIG. 11, the radiation unit 320/330 is positioned at a circumference of outskirts of the insulation panel 310 and has a shape of a tape. A length of the radiation unit 320/330 varies according to a wavelength of a signal to be transceived. The radiation unit 320/330 is extended from another end of the power feeding unit 340 and includes a first radiation unit 320 extended in one direction and a second radiation unit 330 extended in another direction. Referring to FIG. 11, the first radiation unit 320 is extended to the left and the second radiation unit 330 is extended to the right. The left and the right direction may change with each other.

The first radiation unit 320, which is extended to the left, includes a first tape 321 extended in a horizontal direction, a second tape 322 extended by being bent in a vertical direction from the first tape 321 and a third tape 323 extended by being bent again in the horizontal direction from the second tape 322. The first radiation unit has a shape of '⌐'.

The second radiation unit, which is extended to the right, is extended in a shape of '⌐'. The second radiation unit includes a fifth tape 331 extended in a direction opposite to the direction of the first radiation unit 320 from another end of the power feeding unit 340 and a sixth tape 332 extended by being bent in a vertical direction from the fifth tape 331.

The first radiation unit 320 and the second radiation unit 330 are different from each other in length and the number of being bent. A resonant frequency varies according to a length of a radiation unit. Thus, various antennas can be mounted on a mobile terminal 600. A main antenna used for making a call, an antenna used for receiving GPS, an antenna used for such a short-range wireless communication as Wi-Fi or Bluetooth, a DMB antenna used for receiving a broadcast signal from a satellite when watching DMB and the like can be mounted on the mobile terminal.

Each of the antennas uses a signal of a different frequency band. Each antenna is assigned to an end of the top/bottom or an edge of the mobile terminal to minimize an impact between antennas. In order to increase efficiency of transmission and reception of a signal used for making a call, which is a main function of the mobile terminal 600, resonance with an antenna for communication is importance.

A recently used representative communication standard may include GSM (GLOBAL SYSTEM FOR MOBILE COMMUNICATION), UMTS (Universal Mobile Telecommunication System) and LTE (Long Term Evolution). GSM is also called an international mobile telephone and is established as a Pan-Europe standard by being transferred to ETSI (Europe Telecommunication Standards Institute) in 1989 based on a digital cellular system configured by CEPT (Conference of European Postal and Telecommunications administrations)-affiliated GSM (global system for mobile communication).

The UMTS is one of third generation mobile communications and corresponds to a 3GPP (3 generation partnership project) communication standard led by European companies such as Nokia of Finland, Ericsson of Sweden, Siemens of Germany and the like. The UMTS is a private communication service using an asynchronous technological scheme based on a GSM scheme.

LTE means a technology that a third generation mobile communication is longitudinally evolved. LTE is an evolved version of WCDMA (wideband code division multiple access). When applying a communication standard to a specific country only, the communication standard may follow a communication standard of an individual country. However, in terms of versatility, it is preferable for a communication standard to be applied to all communication standard different from each other according to a country. The GSM uses frequencies including 850 MHz, 900 MHz, 1800 MHz and 1900 MHz. The UMTS uses frequencies including 850 MHz, 900 MHz and 2100 MHz. The LTE uses frequencies including 850 MHz, 900 MHz, 1800 MHz, 2100 MHz and 2600 MHz.

Figure 12:
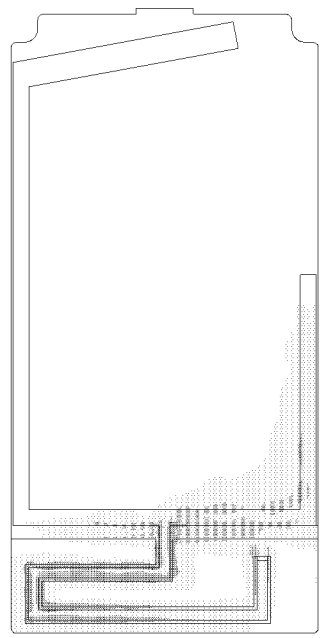
FIG. 12 is a diagram illustrating current distribution according to a frequency of a reradiation antenna of the present invention.
Figure 12:
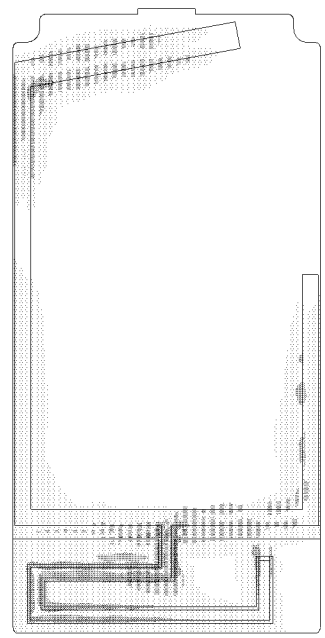
Figure 12:
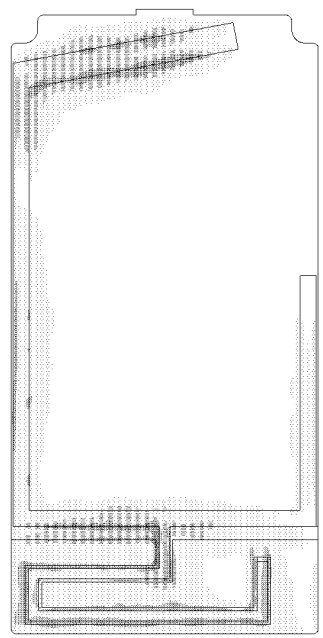
Figure 12:
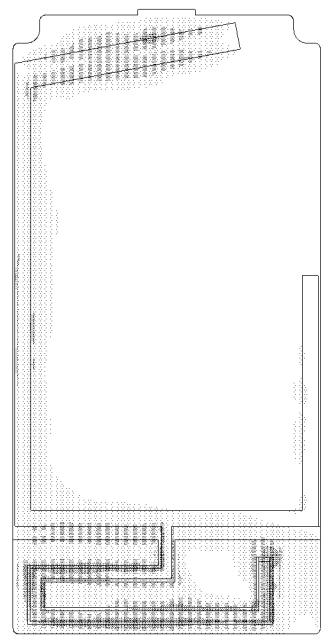

FIG. 12 is a diagram illustrating current distribution of the radiation unit 320/330 and the power feeding unit 340 of the reradiation antenna 300 of an embodiment of the present invention according to a frequency. Since electric current flows a lot in the second radiation unit 330, which is short, in 900 MHz, a signal of 900 MHz can be transceived via the second radiation unit 330. On the contrary, when it is examined distribution of electric current in 1800 MHz, 2100

MHz and 2700 MHz, since electric current flows more in the first radiation unit 320 as frequency is getting higher, the first radiation unit 320 transceives a signal in a high frequency area.

Figure 13:
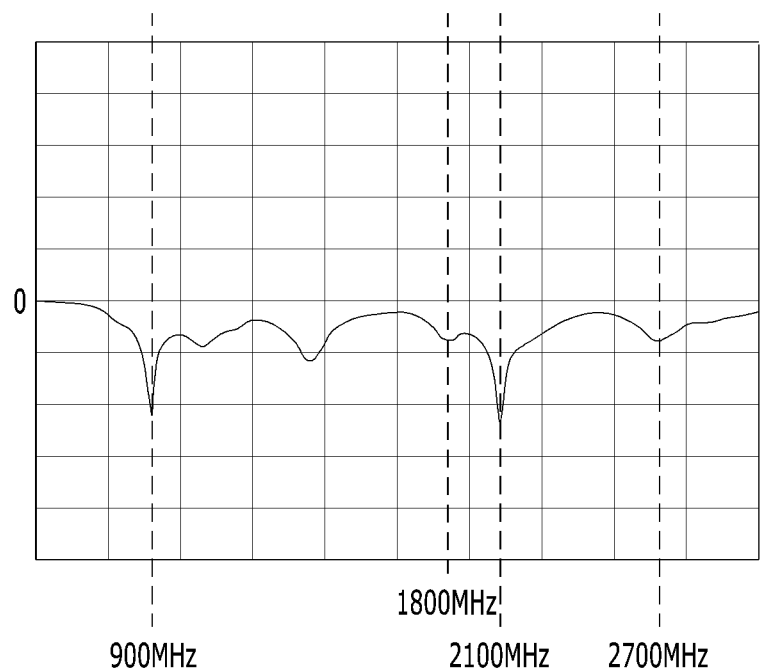
FIG. 13 is a graph for efficiency of a reradiation antenna of the present invention.

FIG. 13 is a graph illustrating efficiency of a reradiation antenna 300 of one embodiment of the present invention. A horizontal axis indicates frequency and a vertical axis indicates an S-parameter (reflection coefficient). The S-parameter indicates a ratio of strength of an incident signal to strength of a signal output by being reflected in a decibel (dB) area. As the strength of the signal output by being reflected is getting smaller, the reflection coefficient has a negative number. As a reflection coefficient becomes smaller, the strength of a reflected signal becomes stronger. Hence, it indicates high efficiency. In 900 MHz, 1800 MHz, 2100 MHz and 2700 MHz, an S-parameter graph shows peaks in a down direction. Since the reradiation antenna 300 is resonant in the aforementioned frequencies, efficiency becomes high.

Figure 14:
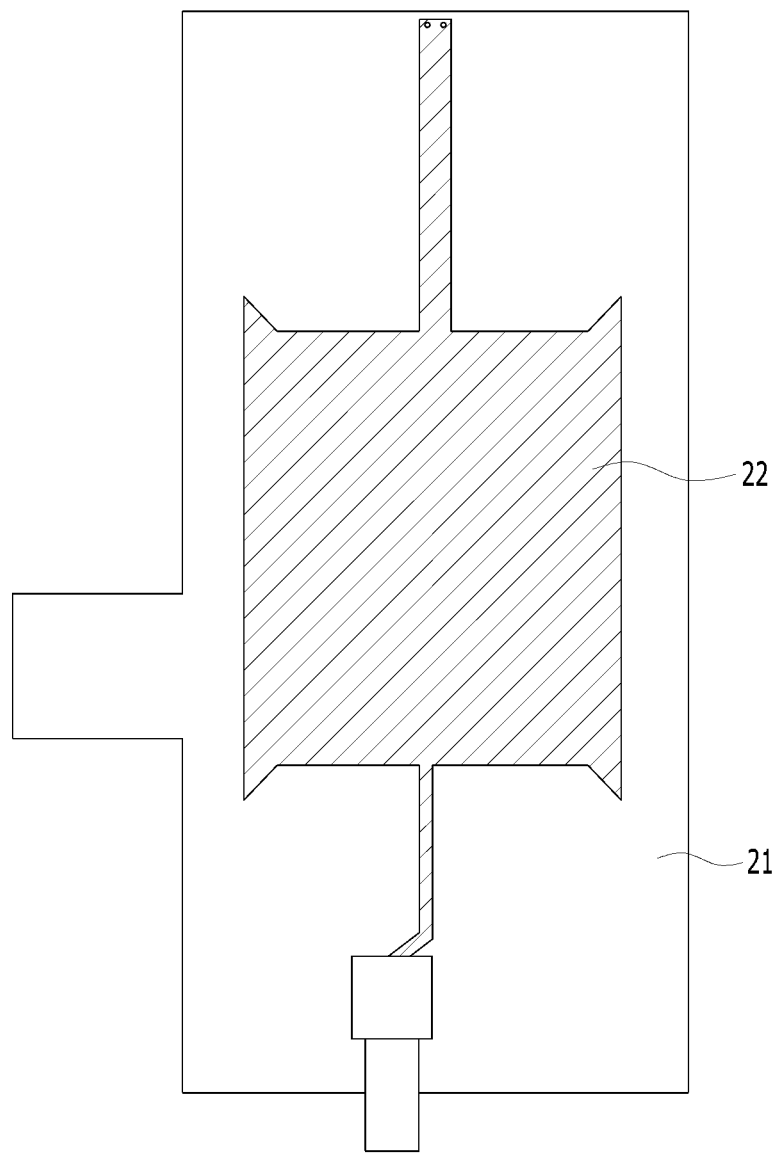
FIG. 14 is a diagram illustrating a legacy reradiation antenna.
Figure 15:
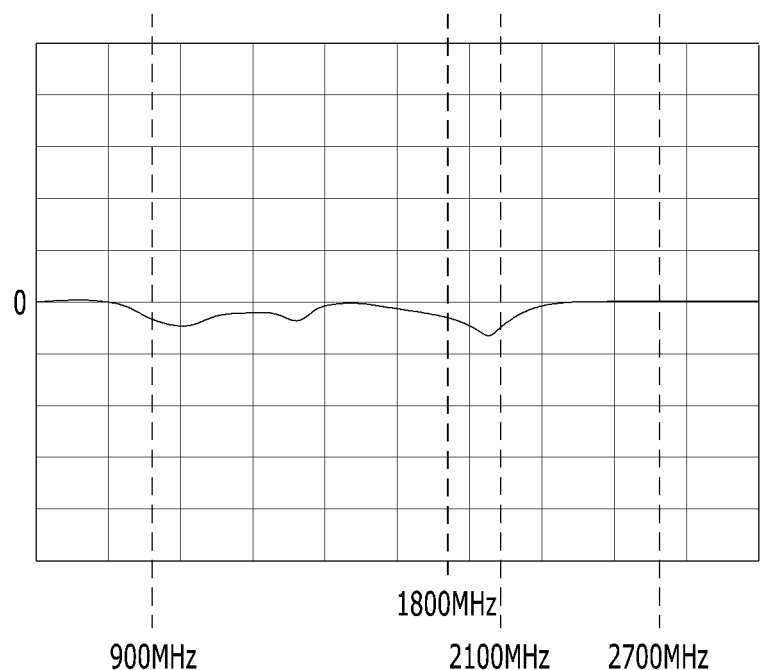
FIG. 15 is a graph for efficiency of a legacy reradiation antenna.

FIG. 14 is a diagram illustrating a legacy reradiation antenna 20 and FIG. 15 is a graph for efficiency of the legacy reradiation antenna 20. Unlike a radiation unit of a tape shape of the present invention, a legacy radiation unit 22 has a shape of a plate and is positioned at the center of an insulation layer 21.

For the radiation unit 22 of a plate-shape structure, since it is not resonant in various frequency bands, unlike FIG. 15, there is less peaks of a reflection coefficient projecting in down direction. Values in frequency bands (900 MHz, 1800 MHz, 2100 MHz and 2700 MHz) used in third generation communication are also less than values of the reradiation antenna 300 of the present invention.

Also, for the wireless charger 100 of the present invention, since the reradiation antenna 300 is positioned at the top of the power transmission coil, if the reradiation antenna 300 is positioned at the center as shown in FIG. 14, the amount of power delivered to the mobile terminal 600 from the power transmission coil is reduced, thereby reducing efficiency. In particular, embodiments of the present invention are applicable to various frequency bands compared to the legacy reradiation antenna 300. Although the reradiation antenna is arranged together with the power transmission coil 140, an efficiency degrading problem between the reradiation antenna and the power transmission coil can be minimized.

Figure 16:
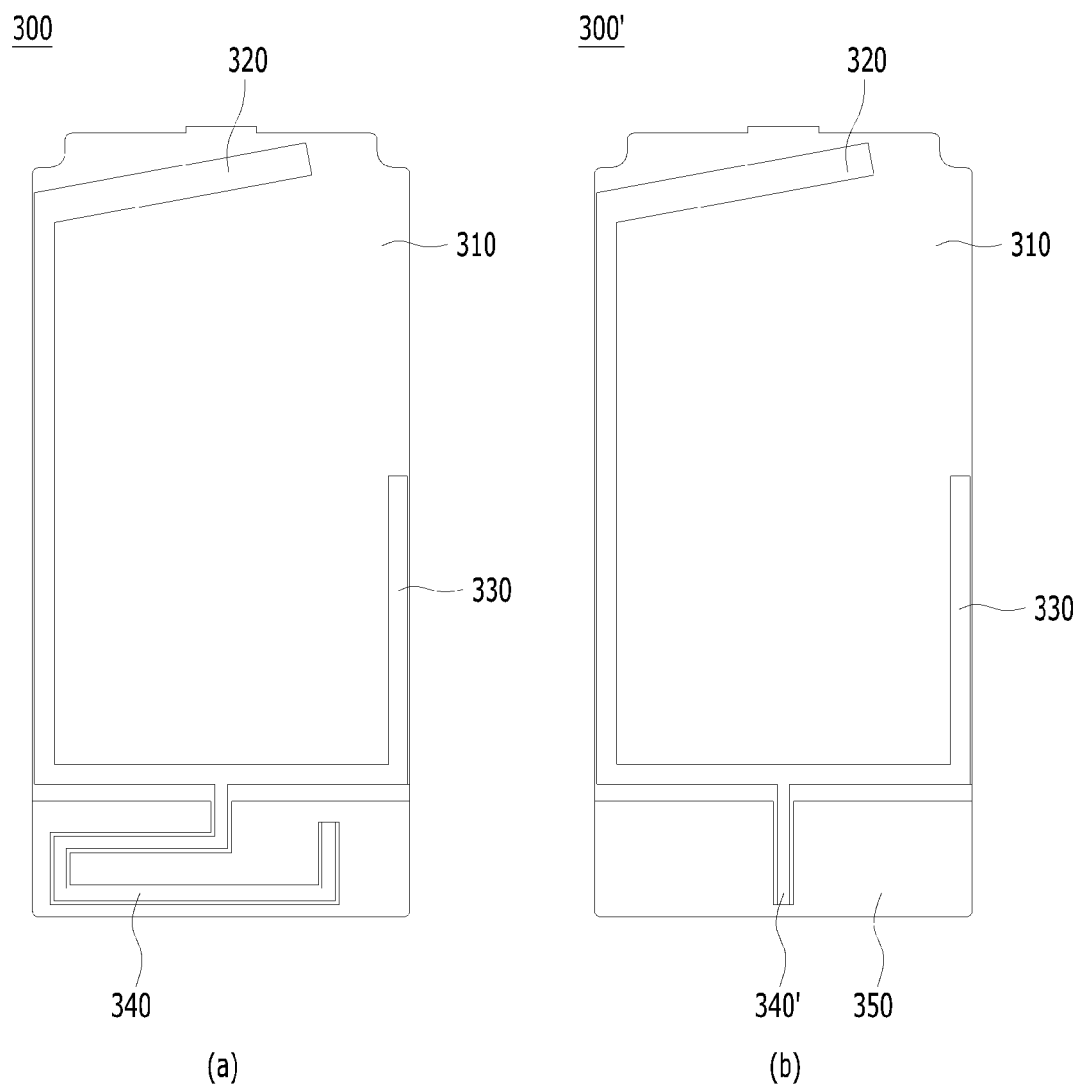
FIG. 16 is a diagram illustrating a further different embodiment of a reradiation antenna of the present invention.
Figure 17:
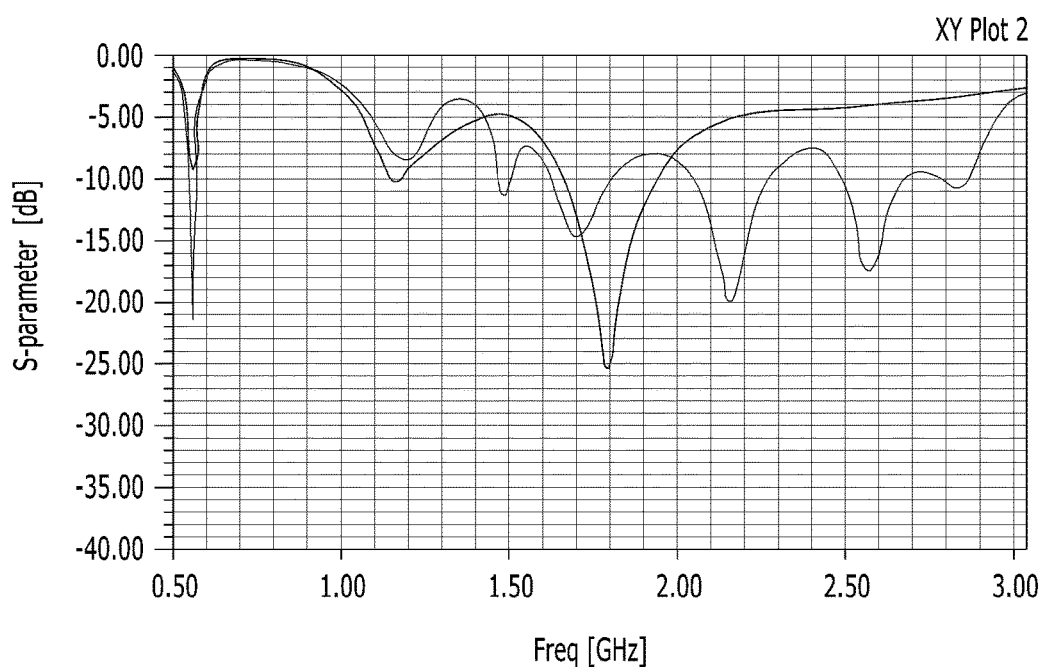
FIG. 17 is a graph for efficiency of a reradiation antenna shown in FIG. 16.

Next, FIG. 16 is a diagram illustrating a further different embodiment of a reradiation antenna 300 of the present invention. The reradiation antenna 300 shown in FIG. 16 (*a*) has a meandering shape such that the power feeding unit 340 is bent many times. A reradiation antenna 300' shown in FIG. 16 (*b*) includes a power feeding unit 340' extended in a straight line. FIG. 17 is a graph for efficiency of the reradiation antenna 300 shown in FIG. 16. A thick line indicates the efficiency when the power feeding unit 340 of the meander shape is applied and a thin line indicates the efficiency when the power feeding unit 340' of the shape of a straight line is applied.

The power feeding unit 340 of the meander shape actually extends a length of the radiation unit 320/330. Hence, there exist more peak points heading to a down direction in a graph of an s-parameter. This indicates that transmission and reception efficiency of a signal is high on various frequency bands.

Figure 18:
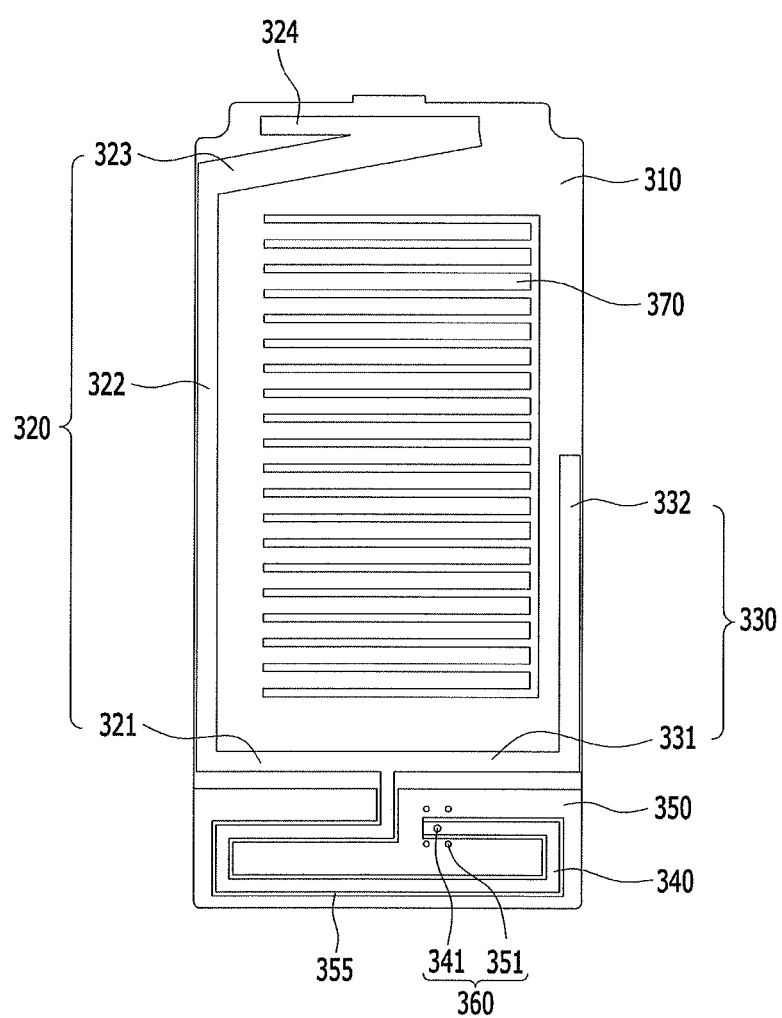
FIG. 18 is a diagram illustrating a further different embodiment of a reradiation antenna of the present invention.
Figure 19:
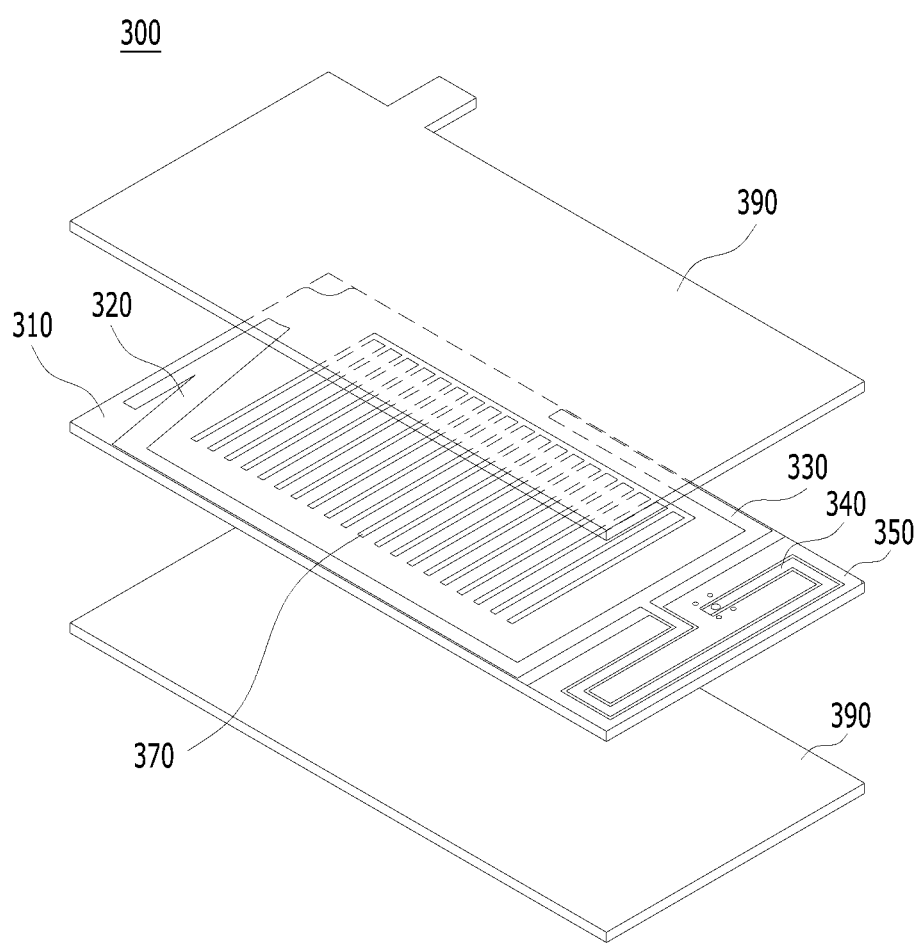
FIG. 19 is a diagram illustrating a rear side of a reradiation antenna shown in FIG. 18.

FIG. 18 is a diagram illustrating another embodiment of a reradiation antenna 300 of the present invention, and FIG. 19 is a diagram illustrating a rear side of the reradiation antenna 300 shown in FIG. 18. In order to increase the efficiency in a high frequency band compared to the reradiation antenna 300 mentioned earlier, a radiation unit 320/330 of the reradiation antenna 300 can be modified.

As shown in FIG. 18, a first radiation unit 320 can further include a fourth radiation unit 324, which is bent in a horizontal direction from a third tape 323. As a length of the first radiation unit 320 becomes longer, the transmission and reception efficiency of a signal on 2600 MHz is improved. One end of a power feeding unit 340 is connected with a power source and a connector 360 is used to connect a ground contact unit 350 with the ground.

The connector 360 includes pins 341/351. The power feeding unit 340 is connected with the power source via a second pin 341 and the ground contact unit 350 is connected with the ground via a first pin 351. The power feeding unit 340 and the ground contact unit 350 are connected with the power source and the ground by inserting the power source and a ground connection terminal to the connector 360. In order to connect the power feeding unit 340 and the ground contact unit 350 with each other using the connector 360 and the pins 341/351, holes are formed in an end of the power feeding unit 340 and the ground contact unit 350 adjacent to the power feeding unit 340. The pins of the connector 360 are inserted into the holes.

A radiation unit 320/330 is not formed on one side of an insulation panel 310 and a center part of another side of the insulation panel. One side of the insulation panel and the center part of another side of the insulation panel are empty. A capacitive proximity sensor 370 can be installed in the empty space. Further, the capacitive proximity sensor 370 corresponds to a sensor configured to response when an object of which a dielectric constant is greater than 1.2 exists. A material within the sensor operates as a condenser. Also, if a total capacitive component of a sensor probe increases, it becomes an actuation signal of an internal oscillator and drives a power transmission coil 140.

If electric current always flows in the power transmission coil 140, power is wasted. Hence, when a user puts the terminal 600 on the top of the wireless charger 100 to charge the terminal, the capacitive proximity sensor 370 detects the terminal and makes electric current flow in the power transmission coil 140.

Figure 20:
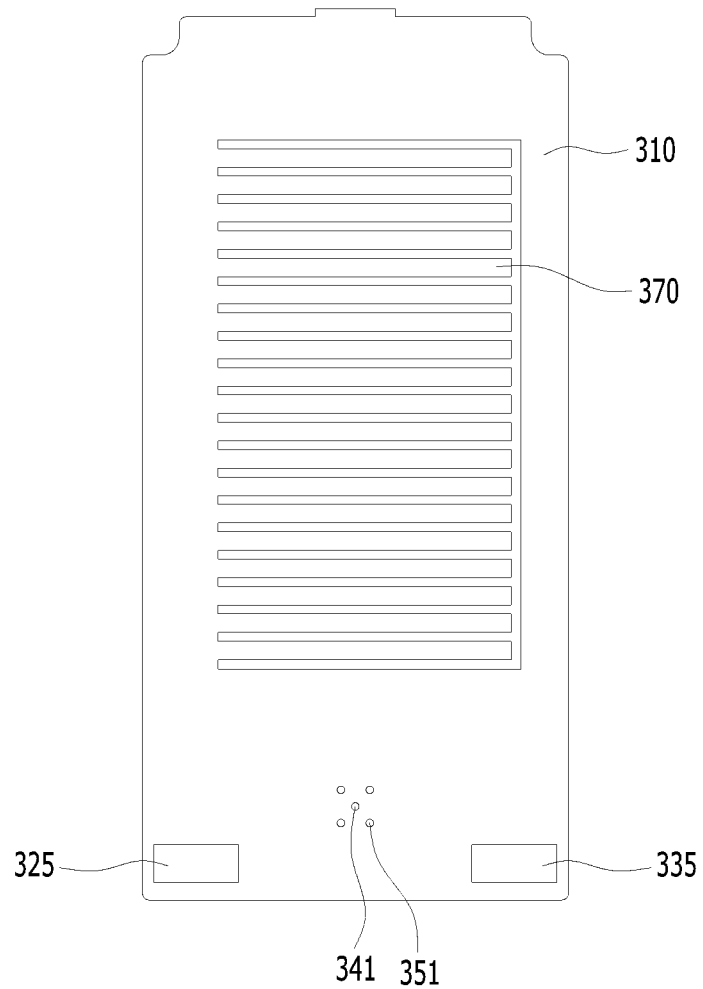
FIG. 20 is a diagram illustrating one embodiment of a coating structure of a reradiation antenna of the present invention.

Next, FIG. 20 is a diagram illustrating a rear side of a reradiation antenna shown in FIG. 19. As shown, an electromagnetic field shielding pattern 380 is formed on the rear side of the reradiation antenna. Since a device using an electromagnetic field is regulated by EMI (Electro Magnetic Interference), radiating an electromagnetic wave greater than a prescribed size is restricted.

The electromagnetic field shielding pattern 380 is formed by a thin film type of a conductive material configured to reduce an electromagnetic field leaked to external to prevent a device using the electromagnetic field from affecting an external device. The electromagnetic shielding pattern is formed by a prescribed pattern to prevent performance of a product from being degraded and increase shielding efficiency.

Figure 21:
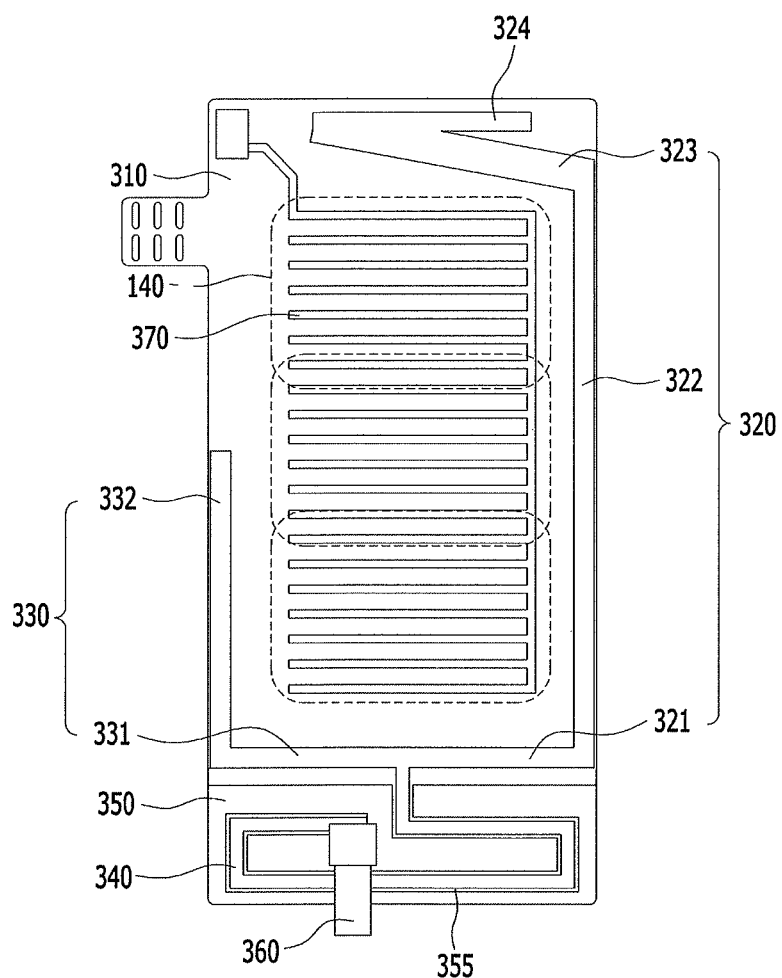
FIG. 21 is a diagram illustrating a rear side of a combined state of FIG. 20.

The electromagnetic field shielding pattern 380 includes a conductive material. As shown in FIG. 21, the electromagnetic shielding pattern is configured by a pattern of a tape shape extended in a direction (horizontal direction) orthogonal to a direction of extension of a radiation unit 320/330 to minimize reduction of an electromagnetic field directly affecting charging among electromagnetic field formed by the power transmission coil 140 and minimize an impact affecting a reradiation antenna 300.

Although the radiation unit 320/330 of the reradiation antenna according to an embodiment of the present invention is also extended in a horizontal direction, most of the radiation unit 320/330 is extended in a vertical direction (a second tape and a fifth tape). Hence, in order to minimize an impact affecting the reradiation antenna 300, the electromagnetic field shielding pattern 380 can be configured by a plurality of tapes extended in the horizontal direction. If an electromagnetic field shielding pattern is directly formed on the insulation panel 310, a separate electromagnetic field shielding pattern can be omitted.

In addition, an additional radiation unit 320/330 can be further formed on a rear side. The additional radiation unit is positioned at the rear side of a side on which the ground contact unit 350 and the power feeding unit 340 are formed. Although the additional radiation unit does not directly contact the ground contact unit 350 and the power feeding unit 340 by the insulation panel 310, since electric current also flows when the additional radiation unit is separated from the ground contact unit 350 and the power feeding unit 340, the additional radiation unit can perform a function of a radiation unit. As shown in FIG. 20, if a third radiation unit 325 and a fourth radiation unit 335 are further formed on a rear side of the insulation panel 310, a transmission and reception rate of signals in 1800 MHz, 2100 MHz and 2600 MHz bands is increased.

Next, FIG. 19 is a diagram illustrating one embodiment of a coating structure of a reradiation antenna 300 of the present invention. A radiation unit 320/330 of an antenna, a ground contact unit 350 and a power feeding unit 340 can be formed by printing a conductive material on an insulation panel 310. In order to protect the printed conductive material, a coating layer 390 can be further formed on a surface of the printed conductive material.

FIG. 21 is a diagram illustrating a rear side of a combined state of FIG. 19. When a coating layer is formed, a connector 360 configured to connect with an external power source or a ground contact unit 350 is combined. An additional connection terminal may be further included to measure a state of an antenna, temperature of a wireless charger and the like. A dotted line shown in FIG. 21 is a position corresponding to a power transmission coil 140.

Figure 22:
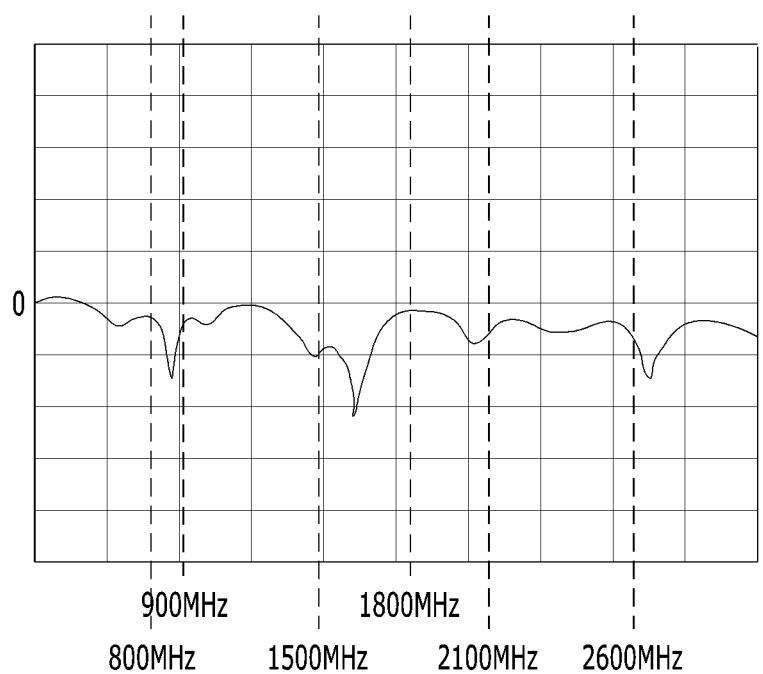
FIG. 22 is a graph for efficiency of a reradiation antenna of the present invention.

FIG. 22 is a graph for efficiency of a reradiation antenna 300 of the present invention. A horizontal axis indicates a wavelength and a vertical axis indicates a reflection coefficient. As a reflection coefficient value is smaller, a radiation/reception performance of a radio wave is better. In 800 MHz, 900 MHz, 1500 MHz, 1800 MHz, 2100 MHz and 2600 MHz corresponding to frequency bands mainly used in wireless communication, a value of the reflection coefficient is small. In order to examine the efficiency in more detail, reference to Table 1 will be made. Table 1 shows permitted electric power to reflected electric power according to frequency.

TABLE 1

| Band | Level (Max) (dBm) | Reference Position Signal Level(dBm) | Loss(dBm) |
|---|---|---|---|
| GSM 850 | 33 | 23.3 | 9.7 |
| GSM 900 | 33 | 23.1 | 9.9 |
| GSM 1800 | 30 | 17.6 | 12.4 |
| GSM 1900 | 30 | 16.8 | 13.2 |
| UMTS 850(BAND 5) | 24 | 14.2 | 9.8 |
| UMTS 900(BAND 8) | 24 | 14.4 | 9.6 |
| UMTS 2100(BAND 1) | 24 | 10.9 | 13.1 |
| LTE 700(BAND 17) | 23 | 15.1 | 7.9 |
| LTE 800(BAND 20) | 23 | 15.0 | 8.0 |
| LTE 900(BAND 8) | 23 | 14.1 | 8.9 |
| LTE 1800(BAND 3) | 23 | 11.6 | 11.4 |
| LTE 2100(BAND 1) | 23 | 10.0 | 13.0 |
| LTE 2600(BAND 7) | 23 | 9.2 | 13.8 |

As a size of a reflected signal is larger, the efficiency becomes better. When a size of a lost signal is less than 15 dBm, the signal can be used as a reradiation antenna 300. As shown in Table 1, the strength of a lost signal is less than 15 dB in all bands.

Figure 23:
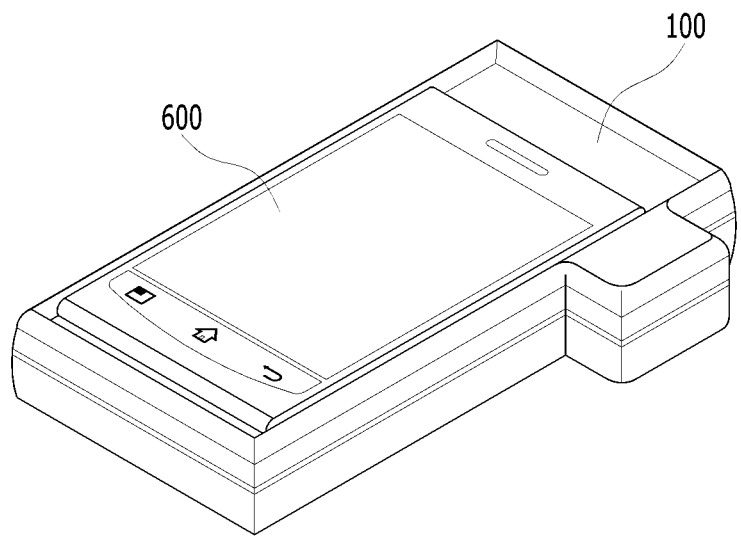
FIG. 23 is a diagram illustrating a state that a mobile terminal is mounted on a wireless charger according to an embodiment of the present invention.
Figure 23:
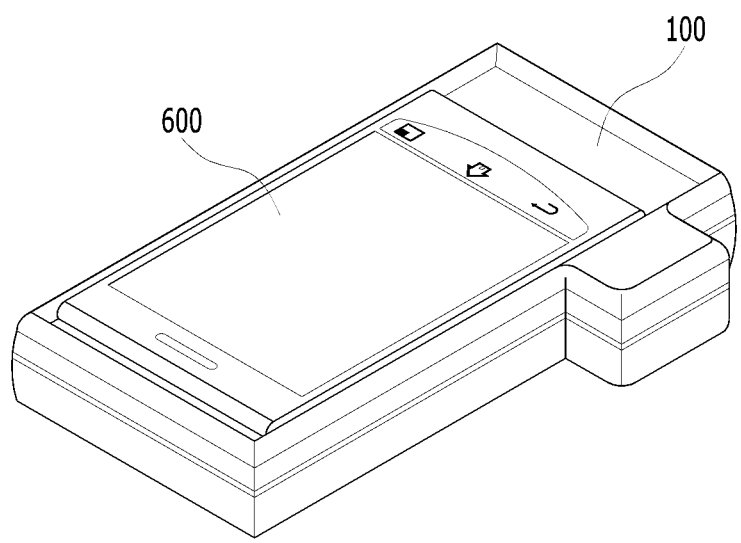

FIG. 23 is a diagram illustrating a mobile terminal 600 mounted on a wireless charger 100 according to an embodiment of the present invention. When mounting the mobile terminal 600 on the wireless charger, as shown in FIG. 23 (a), a bottom part of the mobile terminal 600 can be positioned at a side at which a ground contact unit 350 of a reradiation antenna 300 is positioned. Or, as shown in FIG. 23 (b), the bottom part of the mobile terminal 600 can be positioned at a side opposite to a side at which the ground contact unit 350 of a reradiation antenna 300 is positioned.

In general, since a main antenna of the mobile terminal 600 is positioned at the bottom of the mobile terminal 600, the efficiency may vary according to a direction on which the mobile terminal is mounted. No matter what a direction on which the mobile terminal is mounted, the efficiency greater than a prescribed criteria is obtained to make a function of the reradiation antenna 300 be performed. Hence, it is preferable to check not only the performance of a forward direction (a) but also the performance of a reverse direction. Table 2 shows a size of a permitted signal, a size of a reflected signal and a size of a lost signal in a reversed direction.

TABLE 2

| Band | Level(Max) (dBm) | Reverse Direction Signal Level(dBm) | Loss(dBm) |
|---|---|---|---|
| GSM 850 | 33 | 20.7 | 12.3 |
| GSM 900 | 33 | 19.3 | 13.7 |
| GSM 1800 | 30 | 16.1 | 13.9 |
| GSM 1900 | 30 | 16.3 | 13.7 |
| UMTS 850(BAND 5) | 24 | 11.1 | 12.9 |
| UMTS 900(BAND 8) | 24 | 10.9 | 13.1 |
| UMTS 2100(BAND 1) | 24 | 11.1 | 12.9 |
| LTE 700(BAND 17) | 23 | 12.8 | 10.2 |
| LTE 800(BAND 20) | 23 | 12.2 | 10.8 |
| LTE 900(BAND 8) | 23 | 11.1 | 11.9 |
| LTE 1800(BAND 3) | 23 | 10.4 | 12.6 |
| LTE 2100(BAND 1) | 23 | 10.0 | 13.0 |
| LTE 2600(BAND 7) | 23 | 9.0 | 14.0 |

Although the strength of a lost signal in a reverse direction is greater than the strength of a lost signal in a forward direction, since the strength of the lost signal is less than 15 dBm, it may be used as a reradiation antenna 300.

As mentioned in the foregoing description, an embodiment of the present invention provides a reradiation antenna capable of receiving a radio signal and delivering the signal to a terminal while performance of a wireless charger is not degraded. In addition, because the performance of a reradiation antenna according to an embodiment of the present invention is not degraded by an electromagnetic field shielding sheet of a wireless charger, the reradiation antenna has excellent efficiency.

In addition, because a reradiation antenna according to an embodiment of the present invention can transmit and receive signals of various frequencies by being equipped with a conductive tape of various lengths, the reradiation antenna may have versatility.

That is, the reradiation antenna can receive and deliver a radio signal to a terminal while performance of a wireless charger is not degraded. In addition, because the performance of a reradiation antenna is not deteriorated by electromagnetic field shielding sheet of a wireless charger, the reradiation antenna has an excellent efficiency. Further, because the reradiation antenna is equipped with a conductive tape of various lengths, the reradiation antenna has versatility when transmitting and receiving a signal of various frequencies.

While the present invention has been described and illustrated herein with reference to the preferred embodiments thereof, the present invention is not limited to the aforementioned specific embodiment. It will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A reradiation antenna, comprising:
   an insulation panel;
   a ground contact formed on one side of the insulation panel;
   a slot formed by eliminating a part of the ground contact by exposing the insulation panel;
   a power feeding unit formed on the insulation panel between the slot and separated from the ground contact and connected with a power source using a first end of the power feeding unit; and
   a radiation unit formed on one side of the insulation panel connected with a second end of the power feeding unit positioned at an opened end of the slot, and including a plurality of conductive tapes separated from each other,
   wherein the plurality of conductive tapes extend in a first direction and are arranged in parallel in a second direction perpendicular to the first direction,
   wherein the first direction is parallel to a longitudinal direction of the power feeding unit,
   wherein a plurality of slits extend in the first direction between the plurality of conductive tapes, and
   wherein the plurality of conductive tapes comprise at least one or more conductive tapes different from each other in length.

2. The reradiation antenna of claim 1, wherein the plurality of conductive tapes form a V shape pointing towards the power feeding unit by including conductive tapes positioned at a center of the radiation unit having a longer length than conductive tapes positioned toward sides of the radiation unit.

3. The reradiation antenna of claim 1, further comprising:
   a connector including a first pin connected with the ground contact and a second pin connected with the power feeding unit.

4. The reradiation antenna of claim 1, wherein a maximum length among the plurality of conductive tapes corresponds to ¼ of a wavelength of a shortest frequency of a signal transceived by the reradiation antenna, and
   wherein a minimum length among the plurality of conductive tapes corresponds to ¼ of a wavelength of a longest frequency of the signal transceived by the reradiation antenna.

5. The reradiation antenna of claim 1, wherein the radiation unit comprises:
   a distribution unit that extends from the power feeding unit,
   wherein the plurality of conductive tapes extend from the distribution unit and a width of the distribution unit increases as it approaches the power feeding unit.

6. The reradiation antenna of claim 1, further comprising a wireless charger, wherein the wireless charger comprises a power transmission coil positioned below the insulation panel and configured to wirelessly transmit electric power to an external terminal.

7. The reradiation antenna of claim 6, wherein a vertical direction of the insulation panel is longer than a horizontal direction of the insulation panel, and
   wherein the wireless charger further comprises an electromagnetic field shielding pattern formed on another side of the insulation panel and including a plurality of parallel conductive tapes extending in the second direction.

8. The reradiation antenna of claim 7, wherein the electromagnetic field shielding pattern is arranged between the power transmission coil and the insulation panel.

9. The reradiation antenna of claim 6, wherein the radiation unit comprises a first radiation unit, which is bent in a shape of ' ⊏ ' by being extended to a left or a right from the power feeding unit, a second radiation unit, which is bent in a shape of ' ㄴ ' by being extended in a direction opposite to a direction of the first radiation unit, and
   wherein the wireless charger further comprises a capacitive proximity sensor including a plurality of parallel conductive tapes formed between the first radiation unit and the second radiation unit, extending in a horizontal direction on the one side of the insulation panel.

10. A reradiation antenna, comprising:
    an insulation panel;
    a ground contact formed on one side of the insulation panel;
    a slot formed by eliminating a part of the ground contact by exposing the insulation panel;
    a power feeding unit formed on the insulation panel between the slot and separated from the ground contact and connected with a power source using a first end of the power feeding unit; and
    a radiation unit formed on one side of the insulation panel, connected with a second end of the power feeding unit positioned at an opened end of the slot,
    wherein the radiation unit corresponds to a tape shape positioned at outside of the insulation panel, such that a center part of the insulation panel is empty,
    wherein the power feeding unit has a meander shape,
    wherein the radiation unit comprises:
    a first radiation unit extended in a first direction from the power feeding unit, and
    a second radiation unit extended in a direction opposite to the first direction, and
    wherein the second radiation unit is different in length from the first radiation unit,
    wherein the first radiation unit extends in a shape of ' ⊏ ',
    wherein the first radiation unit comprises a first tape horizontally extending from the second end of the power feeding unit, a second tape vertically extending by being bent from an end of the first tape, and a third tape extending from the second tape, wherein the second radiation unit extends in a shape of 'L', and wherein the second radiation unit comprises a fifth tape extended in a direction opposite to the first tape from the second end of the power feeding unit and a sixth tape vertically extending by being bent from an end of the fifth tape.

11. The reradiation antenna of claim 9, wherein the third tape is slantly extended from the second tape while making an obtuse angle.

12. The reradiation antenna of claim 11, wherein the first radiation unit further comprises a fourth tape extending in a direction identical to a direction of the first tape from an end of the third tape.

13. The reradiation antenna of claim 10, further comprises a third radiation unit formed on another side of the insulation panel corresponding to a position of at least a part of the power feeding unit and a position of at least a part of the ground contact installed in the one side of the insulation panel.

* * * * *